US009398562B2

(12) United States Patent
Feng et al.

(10) Patent No.: US 9,398,562 B2
(45) Date of Patent: Jul. 19, 2016

(54) CONFIGURATION OF UPLINK AND DOWNLINK GRANT SEARCH SPACES IN AN OFDM-BASED MOBILE COMMUNICATION SYSTEM

(75) Inventors: Sujuan Feng, Langen (DE); Alexander Golitschek Edler Von Elbwart, Langen (DE); Ayako Horiuchi, Osaka (JP); Daichi Imamura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 439 days.

(21) Appl. No.: 13/702,236

(22) PCT Filed: Jun. 17, 2011

(86) PCT No.: PCT/EP2011/003024
§ 371 (c)(1),
(2), (4) Date: Feb. 13, 2013

(87) PCT Pub. No.: WO2011/160799
PCT Pub. Date: Dec. 29, 2011

(65) Prior Publication Data
US 2013/0208645 A1 Aug. 15, 2013

(30) Foreign Application Priority Data

Jun. 21, 2010 (EP) .................................. 10006439

(51) Int. Cl.
*H04W 72/00* (2009.01)
*H04L 5/00* (2006.01)
(52) U.S. Cl.
CPC ............. *H04W 72/005* (2013.01); *H04L 5/003* (2013.01); *H04L 5/0091* (2013.01)

(58) Field of Classification Search
None
See application file for complete search history.

(56) References Cited

U.S. PATENT DOCUMENTS

| 8,634,374 | B2 * | 1/2014 | Yang et al. ..................... 370/330 |
| 2011/0299489 | A1 * | 12/2011 | Kim et al. ..................... 370/329 |
| 2012/0320782 | A1 * | 12/2012 | Seo et al. ....................... 370/252 |

FOREIGN PATENT DOCUMENTS

| WO | 2008/157692 A2 | 12/2008 |
| WO | 2009/022314 A2 | 2/2009 |

OTHER PUBLICATIONS

LG Electronics Inc.: "Blackhaul Control Channel Design in Downlink", TSG-RAN WG1 Meeting #61 R1-102700, Montreal, Canada; May 10-14, 2010.

(Continued)

*Primary Examiner* — Donald Mills
(74) *Attorney, Agent, or Firm* — Pearne & Gordon LLP

(57) ABSTRACT

The invention relates to methods for detecting at least one of a downlink grant and an uplink grant within a sub-frame of an OFDM-based mobile communication system. The invention provides a reception apparatus (e.g. a relay node or a mobile terminal) that are adapted to perform these methods. The invention defines the uplink grant search space to form a subset of the downlink grant search space. In other words, in the frequency domain, the uplink grant search space is defined on a subset of the resource block pairs that form the downlink search space. This configuration allows downlink data to be mapped to the remaining resources outside the uplink grants search space and the resources used for a downlink grant. Furthermore, the downlink grants comprise an indication of whether the uplink grant search space in the sub-frame comprises (user) data or not.

13 Claims, 20 Drawing Sheets

(56) References Cited

OTHER PUBLICATIONS

Notice of Reasons for Rejection for Japanese Application No. 2013-515756 dated for Sep. 2, 2014.
ZTE: "The mapping schemes of R-PDCCH", 3GPP Draft; R1-102915 R-PDCCH Mapping, 3rd Generation Partnership Project (3GPP), Mobile Competence Centre, 650, Route Des Lucioles, F-06921 Sophia-Antipolis Cedex, France, vol. RAN WG1, No. Montreal, Canada; 20100510, May 4, 2010, XP050420046.
Ericsson et al: "Considerations on 1-15 R-PDCCH design", 3GPP Draft; R1-102634 Considerations on R-PDCCH Design, 3rd Generation Partnership Project (3GPP), Mobile Competence Centre, 650, Route Des Lucioles, F-06921 Sophia-Antipolis Cedex, France, vol. RAN WG1, No. Montreal, Canada; 20100510, May 5, 2010, XP050420302.
LG-Nortel: "R-PDCCH Multiplexing for 1-15 LTE-A relay node", 3GPP Draft; R1-103145 R-PDCCH Multiplexing for LTE-A Relay Node, 3rd Generation Partnership Project (3GPP), Mobile Competence Centre, 650, Route Des Lucioles, F-06921 Sophia-Antipolis Cedex, France, vol. RAN WG1, No. Montreal, Canada; 20100510, May 4, 2010, XP050420213.
Samsung: "R-PDCCH multiplexing", 1-15 3GPP Draft; R1-103041 R-PDCCH Multiplexing, 3rd Generation Partnership Project (3GPP), Mobile Competence Centre, 650, Route Des Lucioles, F-06921 Sophia-Antipolis Cedex, France, vol. Ran WG1, No. Montreal, Canada; 20100510, May 4, 2010.
European Search Report for Application No. 10006439.3-2415 dated Feb. 21, 2011.
International Search Report for Application No. PCT/EP2011/003024 dated Apr. 8, 2011.

* cited by examiner

CONFIGURATION OF UPLINK AND DOWNLINK GRANT SEARCH SPACES IN AN OFDM-BASED MOBILE COMMUNICATION SYSTEM

FIELD OF THE INVENTION

The invention relates to methods for detecting at least one of a downlink grant and an uplink grant within a sub-frame of a OFDM-based mobile communication system. Furthermore, the invention provides a reception apparatus (e.g. a relay node or a mobile terminal) that are adapted to perform these methods. The invention further relates to the definition of a control channel signal, in particular a downlink grant, and a transmission apparatus (e.g. a base station) that is capable of generating and transmitting same.

The invention is inter alia applicable to a 3GPP LTE-A system as standardized by the $3^{rd}$ Generation Partnership Project (3GPP).

TECHNICAL BACKGROUND

3GPP Long Term Evolution (3GPP LTE)

Third-generation mobile systems (3G) based on WCDMA radio-access technology, such as UMTS (Universal Mobile Communications System), are currently deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE. The work item (WI) specification on LTE called Evolved UMTS Terrestrial Radio Access (UTRA) and UMTS Terrestrial Radio Access Network (UTRAN) is to be finalized as Release 8 (LTE Rel. 8). The LTE system represents efficient packet-based radio access and radio access networks that provide full IP-based functionalities with low latency and low cost. The detailed system requirements are given in 3GPP TR 25.913, "Requirements for Evolved UTRA (E-UTRA) and Evolved UTRAN (E-UTRAN)," version 8.0.0, January 2009 (available at http://www.3gpp.org and incorporated herein by reference).

Component Carrier Structure in LTE (Release 8)

The downlink component carrier of a 3GPP LTE (Release 8) is subdivided in the time-frequency domain in so-called sub-frames. In 3GPP LTE (Release 8) each sub-frame is divided into two downlink slots as shown in FIG. 1, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The sub-frames thus each consist of a number of $2 \cdot N_{symb}^{DL}$ modulation symbols transmitted on respective $N_{RB}^{DL} \times N_{sc}^{RB}$ subcarriers as also shown in FIG. 2.

Assuming a multi-carrier communication system, e.g. employing OFDM, as for example used in 3GPP Long Term Evolution (LTE), the smallest unit of resources that can be assigned by the scheduler is one "resource block" (or "physical resource block", abbreviated PRB). A physical resource block is defined as $N_{symb}^{DL}$ consecutive OFDM symbols in the time domain and $N_{sc}^{RB}$ consecutive subcarriers in the frequency domain as exemplified in FIG. 2. In praxis, the downlink resources are assigned in resource block pairs (or physical resource block (PRB) pairs). A resource block pair consists of two resource blocks on the same subcarriers of the sub-frame, i.e. spans $N_{sc}^{RB}$ consecutive subcarriers in the frequency domain and the entire $2 \cdot N_{symb}^{DL}$ modulation symbols of the sub-frame in the time domain. $N_{symb}^{DL}$ may be either 6 or 7, so that a sub-frame has either 12 or 14 OFDM symbols in total.

In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0, December 2009 section 6.2, available at http://www.3gpp.org and incorporated herein by reference).

The value $N_{RB}^{DL}$ depends on the downlink transmission bandwidth configured in the cell and shall fulfill the relation $N_{RB}^{min,DL} \leq N_{RB}^{DL} \leq N_{RB}^{max,DL}$. Presently, $N_{RB}^{min,DL}=6$ and $N_{RB}^{max,DL}=110$ and represent the smallest and largest downlink bandwidths, respectively, supported by the current version of the specifications in 3GPP LTE (Release 8) and 3GPP LTE-A (Release 10)—see below. $N_{SC}^{RB}$ is the number of subcarriers within one resource block. For a normal cyclic prefix sub-frame structure, $N_{SC}^{RB}=12$ and $N_{symb}^{DL}=7$ in the current versions of the 3GPP specifications for 3GPP LTE (Release 8) and 3GPP LTE-A (Release 10).

In MBSFN operation, the user equipment receives and combines synchronized signals from multiple cells. In order for MBSFN reception, the user equipment performs a separate channel estimation based on MBSFN Reference Signal (MBSFN RS). In order to avoid mixing MBSFN RS and other reference signals (RSs) in the same sub-frame, certain sub-frames, known as MBSFN sub-frames, are reserved for MBSFN transmission.

Up to two of the first OFDM symbols within a sub-frame are reserved for non-MBSFN transmission and the remaining OFDM symbols are used for MBSFN transmission. In the first up to two OFDM symbols, PDCCH for uplink resource assignments and PHICH can be transmitted, and the cell specific reference signal is the same as non-MBSFN sub-frames.

The pattern of MBSFN sub-frames in one cell is broadcasted in the System Information (SI) of the cell. UEs, that are not capable of receiving MBSFN, will decode the first up to two OFDM symbols and ignore the remaining OFDM symbols.

MBSFN sub-frame configuration supports both 10 ms and 40 ms periodicity. And sub-frames #0, #4, #5 and #9 cannot be configured as MBSFN sub-frames.

General Structure for Downlink Physical Channels

The general downlink 3GPP LTE (Release 8) baseband signal processing according to 3GPP TS 36.211 section 6.3 is exemplarily shown in FIG. 6. Further details on the LTE downlink can be found in 3GPP TS 36.211, section 6. A block of coded bits is first scrambled. Up to two code words can be transmitted in one sub-frame.

In general, scrambling of coded bits helps to ensure that receiver-side decoding can fully utilize the processing gain provided by channel code. For each codeword, by applying different scrambling sequence for neighboring cells, the interfering signals are randomized, ensuring full utilization of the processing gain provided by the channel code. The scrambled bits are transformed to a block of complex modulation symbols using the data modulator for each codeword. The set of modulation schemes supported by LTE downlink includes QPSK, 16-QAM and 64-QAM corresponding to 2, 4 or 6 bits per modulation symbol.

Layer mapping and precoding are related to MIMO applications. The complex-valued modulation symbols for each of the code words to be transmitted are mapped onto one or several layers. LTE supports up to four transmit antennas. The antenna mapping can be configured in different ways to provide multi antenna schemes including transmit diversity, beam forming, and spatial multiplexing. Further the resource block mapper maps the symbols to be transmitted on each antenna to the resource elements on the set of resource blocks assigned by the scheduler for transmission. The selection of resource blocks depends on the channel quality information.

Downlink control signaling is carried out by three physical channels:

PCFICH to indicate the number of OFDM symbols used for control signaling in a sub-frame (i.e. the size of the control channel region)

PHICH which carries downlink ACK/NACK associated with UL data transmission

PDCCH which carries downlink scheduling assignments and uplink scheduling assignments.

Downlink Reception in 3GPP LTE

In 3GPP LTE (Release 8), where there is only once component carrier in uplink and downlink, the PCFICH is sent at a known position within the control signaling region of a downlink sub-frame using a known modulation and coding scheme. As the determination of the downlink resources assigned to the user equipment depends on the size of the control signaling region of the sub-frame, i.e. the number of OFDM symbols used for control signaling in the given sub-frame, the user equipments needs to decode the PCFICH in order to obtain the signaled PCFICH value, i.e. the actual number of OFDM symbols used for control signaling in the sub-frame.

If the user equipment is unable to decode the PCFICH or obtains an erroneous PCFICH value, this PCFICH detection error will result in the user equipment not being able to correctly decode the L1/L2 control signaling (PDCCHs) comprised in the control signaling region, so that all resource assignments contained therein are lost.

Physical Downlink Control Channel (PDCCH) and
Physical Downlink Shared Channel (PDSCH)

The physical downlink control channel (PDCCH) carries scheduling grants for allocating resources for downlink or uplink data transmission. Each scheduling grant is defined based on Control Channel Elements (CCEs). Each CCE corresponds to a set of Resource Elements (REs). In 3GPP LTE, one CCE consists of 9 Resource Element Groups (REGs), where one REG consists of four consecutive REs (in the frequency domain) excluding potential REs of reference signals.

The PDCCH for the user equipments is transmitted on the first $N_{symb}^{PDCCH}$ OFDM symbols (either 1, 2 or 3 OFDM symbols as defined by the PCFICH) within a sub-frame. The region occupied by the $N_{symb}^{PDCCH}$ in the time domain and the $N_{RB}^{DL} \times N_{sc}^{RB}$ subcarriers in the frequency domain is also referred to as PDCCH region or control channel region. The remaining $N_{symb}^{PDSCH} = 2 \cdot N_{symb} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant on the physical downlink shared channel (PDSCH), the PDCCH assigns a PDSCH resource for (user) data within the same sub-frame. The PDCCH control channel region within a sub-frame consists of a set of CCE where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE, a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a sub-frame.

On a transport channel level, the information transmitted via the PDCCH is also refereed as L1/L2 control signaling. L1/L2 control signaling is transmitted in the downlink for each user equipment (UE). The control signaling is commonly multiplexed with the downlink (user) data in a sub-frame (assuming that the user allocation can change from sub-frame to sub-frame). Generally, it should be noted that user allocation might also be performed on a TTI (Transmission Time Interval) basis where the TTI length (in the time domain) is equivalent to either one or multiple sub-frames. The TTI length may be fixed in a service area for all users, may be different for different users, or may even by dynamic for each user. Generally, then the L1/L2 control signaling needs only be transmitted once per TTI.

Furthermore, the PDCCH information sent on the L1/L2 control signaling may be separated into the Shared Control Information (SCI) and Dedicated Control Information (DCI).

The physical downlink shared channel (PDSCH) is mapped to the remaining OFDM symbols within one sub-frame that are not occupied by the PDCCH. The PDSCH resources are allocated to the user equipments in units of resource blocks for each sub-frame.

FIG. 8 shows the exemplary mapping of PDCCH and PDSCH within a normal sub-frame (having $2 \cdot N_{symb} = 14$ OFDM symbols in the time domain), respectively a resource block pair (see magnification). The first $N_{symb}^{PDCCH} = 2$ OFDM symbols (PDCCH region) are used for L1/L2 control signaling, i.e. for signaling the PDCCH, and the remaining $N_{symb}^{PDSCH} = 12$ OFDM symbols (PDSCH region) are used for data. Within the resource block pairs of all sub-frames, cell-specific reference signals, CRS (Common Reference Signal), are transmitted. These cell-specific reference signals are transmitted on one or several of antenna ports 0 to 3. In this example, the CRS are transmitted from two antenna ports: R0 is from antenna port 0 and R1 is from antenna port 1.

Furthermore, the sub-frame also contains UE specific reference signals, DM-RS (DeModulation Reference Signal) that are used by the user equipments for demodulating the PDSCH. The DM-RS are only transmitted within the resource blocks where the PDSCH for a certain user equipment is allocated. In order to support MIMO (Multiple Input Multiple Output) with DM-RS, four DM-RS layers are defined, which means at most MIMO of four layers is supported. In the example of FIG. 8, DM-RS layer 1, 2, 3, are 4 are corresponding to MIMO layer 1, 2, 3, and 4.

FIG. 9 shows another example where the PDCCH and the PDSCH is mapped to a MBSFN sub-frame. The example of FIG. 8 is quite similar to FIG. 8, except for the MBSFN sub-frame not comprising common reference signals.

For further information on the LTE physical channel structure in downlink and the PDSCH and PDCCH format, see St.

Sesia et al., "LTE—The UMTS Long Term Evolution", Wiley & Sons Ltd., ISBN 978-0-47069716-0, April 2009, sections 6 and 9. Additional information on the use of reference signals and channel estimation in 3GPP LTE can be found in section 8 of this book.

Further Advancements for LTE—LTE-Advanced (3GPP LTE-A)

The frequency spectrum for IMT-Advanced was decided at the World Radio communication Conference 2007 (WRC-07) in November 2008. Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved which is also referred to as "Release 10". The study item covers technology components to be considered for the evolution of E-UTRA, e.g. to fulfill the requirements on IMT-Advanced. Two major technology components which are currently under consideration for LTE-A are described in the following.

In order to extend the overall system bandwidth, LTE-A (Release 10) uses carrier aggregation, where two or more component carriers as defined for LTE (Release 8)—see FIG. 1 and FIG. 2 discussed above—are aggregated in order to support wider transmission bandwidths e.g. up to 100 MHz and for spectrum aggregation. It is commonly assumed that a single component carrier does not exceed a bandwidth of 20 MHz.

A terminal may simultaneously receive and/or transmit on one or multiple component carriers depending on its capabilities:

An LTE-Advanced (Release 10) compatible mobile terminal with reception and/or transmission capabilities for carrier aggregation can simultaneously receive and/or transmit on multiple component carriers. There is one Transport Block (in absence of spatial multiplexing) and one HARQ entity per component carrier.

An LTE (Release 8) compatible mobile terminal can receive and transmit on a single component carrier only, provided that the structure of the component carrier follows the Release 8 specifications.

It is also envisioned to configure all component carriers LTE (Release 8)-compatible, at least when the aggregated numbers of component carriers in the uplink and the downlink are same. Consideration of non-backward-compatible configurations of LTE-A (Release 10) component carriers is not precluded. Accordingly, it will be possible to configure a user equipment to aggregate a different number of component carriers of possibly different bandwidths in the uplink and the downlink.

Relaying Functionality—

Introduction of Relay Nodes to the UTRAN Architecture of 3GPP LTE-A

Relaying is considered for LTE-A as a tool to improve e.g. the coverage of high data rates, group mobility, temporary network deployment, the cell-edge throughput and/or to provide coverage in new areas.

The relay node is wirelessly connected to radio-access network via a donor cell. Depending on the relaying strategy, a relay node may be part of the donor cell or may control cells of its own. In case the relay node is part of the donor cell, the relay node does not have a cell identity of its own (but may still have a relay ID). In the case the relay node is in control of cells of its own, the relay node controls one or several cells and a unique physical-layer cell identity is provided in each of the cells controlled by the relay.

At least "Type 1" relay nodes will be part of 3GPP LTE-A. A "type 1" relay node is a relaying node characterized by the following:

The relay node controls cells, each of which appears to a user equipment as a separate cell distinct from the donor cell.

The cells should have its own Physical Cell ID (defined in 3GPP LTE (Release 8)) and the relay node shall transmit its own synchronization channels, reference symbols, etc.

In the context of single-cell operation, the user equipment should receive scheduling information and HARQ feedback directly from the relay node and send its control channels (SR/CQI/ACK) to the relay node The relay node should appear as a 3GPP LTE-compliant eNodeB to 3GPP LTE-compliant user equipments (i.e. be backwards compatible)

To 3GPP LTE-A-compliant user equipment, a "type 1" relay node should appear differently than 3GPP LTE-compliant eNodeB to allow for further performance enhancement.

An exemplary network structure using relay nodes in 3GPP LTE-A is shown in FIG. 3. The link between donor eNodeB (d-eNB) and relay node is also referred to as relay backhaul link. The link between relay node and user equipments attached to the relay node (r-UEs) is called relay access link.

Propagation Delay Between Node B and Relay Node

In the following, a network configuration as shown in FIG. 3 is assumed for exemplary purposes. The donor eNode B transmits L1/L2 control and data to a so-called macro-user equipment (UE1) and also to a relay (relay node), and the relay node transmits L1/L2 control and data to a so-called relay-user equipment (UE2).

Further assuming that the relay node operates in a time-duplexing mode, i.e. transmission and reception operation are not performed at the same time, we arrive at a non-exhaustive entity behavior over time as shown in FIG. 4. Whenever the relay node is in "transmit" mode, UE2 needs to receive the L1/L2 control channel and physical downlink shared channel (PDSCH), while when the relay node is in "receive" mode, i.e. it is receiving L1/L2 control channel and PDSCH from the Node B, it cannot transmit to UE2 and therefore UE2 cannot receive any information from the relay node in such a sub-frame.

The situation becomes somewhat trickier in case that the UE2 is not aware that it is attached to a relay node. As will be understood by those skilled in the art, in a communication system without relay node any user equipment can always assume that at least the L1/L2 control signal is present in every sub-frame.

In order to support such a user equipment in operation beneath a relay node, the relay node should therefore pretend such an expected behavior in all sub-frames. This leads to a behavior as shown in FIG. 5. The relay node has to transmit the L1/L2 control channel in each sub-frame (here assumed to be in the early part of each sub-frame), before it can switch to reception mode. Additionally shown is a "Gap" which is required to tune the relay node hardware and software from "transmit" to "receive" mode and vice versa, which is typically a fraction of a sub-frame. What can be seen is that effectively the time that is available for transmission from a Node B to a relay node is actually only a fraction of a sub-frame, as indicated in the figure by the dashed box. In 3GPP Release 8, the UE2 behavior shown for sub-frame 2, i.e. to receive only the first part identical to the L1/L2 control signaling, can be achieved by configuring that sub-frame as an "MBSFN sub-frame". Since this is done mainly to tell the UE2 to not process or expect the remainder of that sub-frame, it is also sometimes called a "fake MBSFN sub-frame". In LTE, a node transmitting such "fake MBSFN" sub-frames is required to transmit the first two OFDM symbols of such a sub-frame before it can switch to reception.

As shown in FIG. 6, it can be usually assumed that more than a single relay node is deployed and connected to a Node B. In addition, it is possible that the relay node is not stationary, but can be mobile as a user equipment. For example, a relay node can be installed in a public transportation vehicle such as a bus, train, or tramway. In any case, the distance between Node B and at least one relay node is variable, so that different propagation delay for the signal from Node B to relay nodes will occur.

Using the exemplary deployment of FIG. 6, FIG. 7 illustrates the situation assuming that the relay nodes' transmission is synchronized to the Node B's transmission, as it is for example beneficial for the case that a user equipment should easily hand over between the Node B and a relay node or for simultaneous multipoint transmission purposes. For the first two OFDM symbols of the fake MBSFN sub-frame, Node B, RN1, and RN2 transmit simultaneously. Then for the relay nodes the first gap is required to switch to reception mode, followed by reception of the Node B transmission signal until just before the end of the sub-frame, where the second gap is required by the relay nodes to switch back again to transmission mode before the beginning of the next sub-frame.

As can be seen, depending on the length of the gaps and propagation delay for the signal between Node B and RN1 and between Node B and RN2, a relay node will be able to see only a limited and at least partially different set of OFDM symbols transmitted by the Node B. For RN1, the reception of OFDM symbol #1 overlaps with the gap, as does the reception of OFDM symbol #12 . For RN2, the reception of OFDM symbol #2 overlaps with the gap, as does the reception of OFDM symbol #13 . While RN1 can see OFDM symbols #2 to #11 completely, RN2 can see OFDM symbols #3 to #12 completely. Assuming a simple and cost-effective receiver at the relay node, partially invisible OFDM symbols cannot be used since they would contain a lot of interference and should therefore be considered as corrupt.

It may be thus assumed that the relay node is not able to detect the early part of a sub-frame transmitted by a Node B, which usually carries L1/L2 control information. Therefore, the Node B of transmitting to the relay node may use only those OFDM symbols within a R-PDCCH region within a sub-frame for conveying the L1/L2 control information to the relay node that can be received by the relay node.

Relay Backhaul Sub-Frames

If the eNodeB-to-relay node link operates in the same frequency spectrum as the relay node-to-UE link, simultaneous eNodeB-to-relay node and relay node-to-UE transmissions on the same frequency resource may not be feasible due to the relay transmitter causing interference to its own receiver, unless sufficient isolation of the outgoing and incoming signals is provided. Therefore, when relay node transmits to donor eNodeB (d-eNB), it cannot receive signals from the user equipments attached to the relay node (r-UEs). Likewise, when relay node receives from donor eNodeB (d-eNB), it cannot transmit to user equipments attached to the relay (r-UEs), as has been explained above with respect to FIG. 4 and FIG. 5.

Thus, there is sub-frame partitioning between relay backhaul link (eNodeB-to-relay node link) and relay access link (relay node-to-UE link). Currently it has been agreed that:

Relay backhaul downlink sub-frames, during which eNodeB to relay node downlink backhaul transmission may occur, are semi-statically assigned.

Relay backhaul uplink sub-frames, during which relay node to eNodeB uplink backhaul transmission may occur, are semi-statically assigned or implicitly derived by HARQ timing from relay backhaul downlink sub-frames.

In relay backhaul downlink sub-frames, the relay node will transmit to the donor eNodeB and r-UEs are not supposed to expect any relay transmission. In order to support backward compatibility for r-UEs, the relay node configures the backhaul downlink sub-frames as MBSFN sub-frame. As shown in FIG. 5, the relay backhaul downlink sub-frame consists of two parts. In the first OFDM symbols (up to two), the relay node transmits to r-UEs as it would do for a normal MBSFN sub-frame. In the remaining part of the sub-frame, relay receives from donor eNodeB, so there is no relay node to r-UE transmission in this part of the sub-frame. r-UEs receive the first OFDM symbols (up to two) and ignore the rest part of the sub-frame.

MBSFN sub-frame can be configured for every 10 ms and 40 ms. Hence, relay backhaul downlink sub-frames also support both 10 ms and 40 ms configuration.

Also similar to the MBSFN sub-frame configuration, relay backhaul downlink sub-frames cannot be configured at sub-frames #0, #4, #5 and #9. Those sub-frames that are not allowed to be configured as backhaul downlink sub-frames are called "illegal downlink sub-frames" here.

Relay downlink backhaul sub-frames can be normal sub-frames (as exemplified in FIG. 8) or MBSFN sub-frames (as exemplified in FIG. 9).

Results of the RAN1 Meeting #61 of the 3GPP

As outlined with respect to FIG. 5 and FIG. 7 above, the relay node cannot receive L1/L2 control information (PDCCH) from donor eNodeB within the first OFDM symbols of the sub-frame. Thus, a new physical control channel (R-PDCCH) is used to dynamically or "semi-persistently" assign resources within the semi-statically assigned sub-frames to the relay node for the downlink and uplink backhaul data. The R-PDDCH(s) for the relay node is/are mapped to a R-PDCCH region within the PDSCH region of the sub-frame. The relay node expects to receive R-PDCCHs within this region of the sub-frame. In time domain, the R-PDCCH region spans the configured downlink backhaul sub-frames. In frequency domain, the R-PDCCH region exists on certain resource blocks that are configured for the relay node by higher layer signaling.

The relay backhaul R-PDCCH search space is the region within a sub-frame where relay expects to receive R-PDCCHs (uplink and downlink grants). In time domain, it exists on the configured downlink backhaul sub-frames. In frequency domain, it exists on certain physical resource blocks that are configured for relay by higher layer signaling. R-PDCCH can be used for assigning downlink grant or uplink grant for the backhaul link.

In the meeting #61 of the 3GPP RAN working group 1 (RAN1) the following decisions as to the design and use of the R-PDCCH region within a sub-frame have been agreed (see "Draft Report of 3GPP TSG RAN WG1 #61 v0.1.0", section 6.6, the document being available at http://www.3gpp.org), in particular with respect to the downlink grant search space and the uplink grant search space and R-PDCCH/R-PDSCH multiplexing:

The boundary of downlink grant search space and uplink grant search space is slot boundary of the sub-frame:

Downlink grants are only transmitted in the first slot and uplink grants are only transmitted in the second slot of the sub-frame.

The second slot of an R-PDCCH physical resource block pair (i.e. a physical resource block pair in the R-PDCCH region of the sub-frame) can be allocated to the data channel (R-PDSCH) for a relay node receiving at least part of downlink grant in the first slot of the physical resource block pair.

If the relay node receives a resource allocation (grant) which overlaps a physical resource block pair in which a downlink grant is detected in the first slot, the relay node assumes there is PDSCH data transmission for it in the second slot of that physical resource block pair (see FIG. 11). Otherwise the relay node assumes no data transmission for it in the second slot of that physical resource block pair, i.e. no change to DCI formats.

For an R-PDCCH physical resource block pair where relay node detects at least part of downlink grant in the first slot, the relay node shall assume the first slot of the R-PDCCH physical resource block pair is not used for data transmission.

As can be seen from FIG. 8, FIG. 9 and FIG. 10, the number of REs available for a downlink grant in the first slot of a sub-frame is lower than the number of REs in the second slot of a sub-frame available for uplink grant (irrespective of the antenna number/MIMO layers used). Since there are more modulation symbols (i.e. REs) available in the second slot than in the first slot, the number of REs available for uplink grant is larger than for downlink grant in one physical resource block pair. Therefore, the number of physical resource blocks required to signal an uplink grant is smaller than for signaling a downlink grant, assuming the same code rate (target BLER) for both grants As shown in FIG. 11, it may be assumed that resources for the R-PDSCH are allocated on a per-resource block group basis. The downlink grant comprises a resource allocation field with a bit-map, each bit position of which is indicating whether the RBG (index) linked to the respective bit position of the bit-map is allocated to the relay node or not. If the RBG comprising the downlink grant is allocated to a relay node, the entire remaining resources in the RBG (as shown in FIG. 11) are allocated to the R-PDSCH, i.e. no uplink grant may be signaled in this RBG. This is because a failed blind detection of an uplink grant would lead to a corruption of the downlink data on the R-PDSCH, since a wrong allocation size would be assumed by the relay node.

On the other hand, as shown in FIG. 12, a downlink grant for a relay node may be comprised within the downlink grant search space of a RBG that is allocating resources in another RBG. Simultaneously, the sub-frame may also comprise an uplink grant for the relay node in the uplink grant search space, which allocates an uplink resource for the relay node. In this case the entire resources of the RBG that are not occupied by the downlink grant and the uplink grant are essentially lost and cannot be used otherwise, since—using an RBG-wise allocation of the RBG—no other relay node may be granted resources in this RBG, because they are unaware of some resources of the RBG being allocated to another relay node for the downlink grant and the uplink grant.

SUMMARY OF THE INVENTION

One object of the invention is to propose a new scheme for allocating resource to a reception apparatus where the number of blind decoding attempts is reduced, so that processing and battery power of the reception apparatus can be saved. Another object of the invention is to suggest a scheme for allocating resource to a reception apparatus where the waste of resources due to the allocation scheme is minimized. Furthermore, another object of the invention is to propose a scheme for allocating resource to a reception apparatus, where the size and thus resource utilization for the downlink grants and uplink grants is considered to avoid a waste of resources in a sub-frame.

The object is solved by the subject matter of the independent claims. Advantageous embodiments of the invention are subject to the dependent claims.

A first aspect of the invention is to suggest a new design of the uplink grant search space within a sub-frame. According to this first aspect, the uplink grant search space is a subset (portion) of the downlink grant search space. In other words, in the frequency domain, the uplink grant search space is defined on a subset of the resource block pairs that form the downlink search space. In the time domain, the downlink grant search space may for example consist of physical resource blocks of the sub-frame within the first slot of the sub-frame, while the uplink grant search space may for example consist of physical resource blocks of the sub-frame within the second slot of the sub-frame. Hence, in terms of frequency, the uplink grant search space is always comprising a subset of subcarriers of the physical resource blocks of the sub-frame that form the downlink grant search space (e.g. irrespective of location in the frequency domain of the physical resource blocks comprising a downlink grant). This configuration allows downlink data to be mapped to the remaining resources outside the uplink grants search space and the resources used for a downlink grant.

Furthermore, according to another, second, aspect of the invention, which is providing an alternative implementation to the first aspect, the downlink grants comprise an indication of whether the uplink grant search space in the sub-frame comprises (user) data or not. Accordingly, if the downlink grant indicates that there is (user) data mapped to the uplink grant search space, the reception apparatus (e.g. a relay node or a mobile terminal) does not perform a blind detection for an uplink grant in the uplink grant search space.

Optionally, in an exemplary implementation, the reception apparatus could further assume that the downlink grant allocates the resources in the uplink grant search space to the reception apparatus for (user) data transmission, in case the downlink grant indicates that (user) data is mapped to the uplink grant search space. However, the resources of the uplink grant search space within the sub-frame may also be used otherwise, e.g. assigned to another reception apparatus. The indication of whether data is mapped to the uplink grant search space or not may be advantageous in that it allows that a sub-frame may simultaneously comprise a downlink grant, an uplink grant and (user) data in the downlink and uplink grant search space within the sub-frame.

In one further exemplary implementation pertaining to both, the first and the second aspect mentioned above, the uplink grant search space is further dynamically determined by the reception apparatus based on the blind detection result of the downlink grant search space. For example, if a downlink grant is detected in the downlink grant search space by the reception apparatus, the uplink grant search space may be different (e.g. smaller than) the uplink grants search space assumed by the reception apparatus, in case the reception apparatus does not detect a downlink grant in the downlink grant search space. Hence, the size of the uplink grant search space may be dynamic in terms of being dependent on the presence of a downlink grant in the downlink grant search space of the sub-frame.

A further, third aspect of this invention is suggesting a new control channel signal format for signaling a downlink grant that is capable of indicating whether downlink data has been mapped to the reception apparatus' uplink grant search space. This format is a backward compatible format, which is providing a new interpretation of the resource assignment field. Commonly, the resource assignment field of the control channel signal format (for example DCI format defining a downlink grants (R-PDCCH)) may comprise a bit-map, each bit of which being linked to a resource block (or resource block group) index, and indicating whether the respective resource block (or resource block group) corresponding to the respective bit position in the bit-map is assigned to the reception apparatus or not. According to the third aspect it is assumed that the resource blocks of the physical resource block pairs (or resource block group) that are signaling a downlink grant in the first slot of the sub-frame are (is) allocated to the reception apparatus. The bit of the bit-map in the resource assignment field associate to the resource blocks (or resource block group) signaling the downlink grant is used to signal, whether the data is mapped also to the uplink grant search space in the second slot of the sub-frame, or not, i.e. whether the reception apparatus needs to perform a blind detection for an uplink grant in the second slot or not.

Hence, if the reception apparatus is allocated resources on a per-RBG basis, the bit of the bit-map in the resource assignment field of the downlink grant associated to the resource block group comprising the downlink grant is used as an indicator for indicating to the reception apparatus whether there is data for the reception apparatus mapped to the uplink grant search space within the resource block group comprising the control channel signal or not.

One embodiment of the invention is providing a method for detecting at least one of a downlink grant and an uplink grant within a sub-frame of a OFDM-based mobile communication system. According to this method, a reception apparatus receives a sub-frame from a base station. The sub-frame is logically divided into physical resource block pairs, and a respective resource block pair consists of a resource block within a first slot of the sub-frame and a resource block within a second slot of the sub-frame. The reception apparatus performs a blind detection for a downlink grant within a downlink grant search space of the sub-frame. The downlink grant search space consists of plural physical resource blocks of resource block pairs within the first slot of the sub-frame.

Further, the reception apparatus also performs a blind detection for an uplink grant within an uplink grant search space of the sub-frame. The uplink grant search space consists of a subset of the physical resource blocks within the second slot of the sub-frame located within the physical resource block pairs the physical resource blocks of which form the downlink grant search space.

Another alternative embodiment of the invention also provides a method for detecting at least one of a downlink grant and an uplink grant within a sub-frame of a OFDM-based mobile communication system. In this method, a reception apparatus receives a sub-frame from a base station. The sub-frame is logically divided into physical resource block pairs, and a respective resource block pair consists of a resource block within a first slot of the sub-frame and a resource block within a second slot of the sub-frame. The reception apparatus performs a blind detection for a downlink grant within a downlink grant search space of the sub-frame. The downlink grant search space consists of plural physical resource blocks of resource block pairs within the first slot of the sub-frame.

The reception apparatus determine based on the downlink grant, whether there is data mapped to the uplink grant search space of the sub-frame. If it is determined by the reception apparatus that no data mapped to the uplink grant search space of the sub-frame, it performs a blind detection for an uplink grant within an uplink grant search space of the sub-frame, wherein the uplink grant search space consists of a subset of the physical resource blocks within the second slot of the sub-frame located within the physical resource block pairs the physical resource blocks of which form the downlink grant search space.

The following further improvements according to different embodiments of the invention are applicable to both alternative methods outlined above and to both aspects of the invention mentioned previously.

In one exemplary improvement, the number of physical resource blocks within the second slot of the sub-frame forming the uplink grant search space is determined based on the result of the blind detection for the downlink grant. Accordingly, the size of the uplink grant search space in the sub-frame may for example depend on whether a downlink grant is detected at the reception apparatus in the downlink grant search space.

In another exemplary implementation the uplink grants search space is smaller than the downlink grant search space, i.e. the number of physical resource blocks within the second slot of the sub-frame forming the uplink grant search space is lower than the number of physical resource blocks within the first slot of the sub-frame forming the downlink grant search space.

Furthermore, the uplink grant search space may be dynamic. For example, it may be adjusted based on the presence of a downlink grant in the downlink grant search space In this dynamic configuration, in case a downlink grant is detected in the downlink grant search space, the number of physical resource blocks within the second slot of the sub-frame forming the uplink grant search space is lower than the number of physical resource blocks within the second slot of the sub-frame forming the uplink grant search space, in case no downlink grant is detected in the downlink grant search space.

In case a downlink grant is detected in the downlink grant search space of the sub-frame, the reception apparatus may for example determine the uplink grant search space to consist of a subset of the physical resource blocks within the second slot of the sub-frame, belonging to the physical resource block pairs of the physical resource blocks on which the downlink grant is detected in the first slot of the sub-frame.

In case no downlink grant is detected in the downlink grant search space of the sub-frame, the reception apparatus may for example determine the uplink grant search space to consist of a subset of the physical resource blocks within the second slot of the sub-frame belonging to the resource block pairs of the physical resource blocks forming the downlink grant search space in the first slot of the sub-frame.

In another exemplary embodiment of the invention, the relation between the downlink grant search space and the uplink grant search space of the sub-frame may be defined in different fashions. For example, the uplink grant search space may be defined relative to the downlink grant search space by means of (pre-) configuration or by corresponding control signaling, e.g. RRC signaling. In one exemplary implementation of this embodiment, the number of physical resource blocks within the second slot of the sub-frame forming the uplink grant search space is determined by the reception apparatus according to control signaling or a predefined rule based on which the uplink grant search space can be derived from the downlink grant search space.

In one example for a pre-configuration, the uplink grant search space consists of the physical resource blocks in the second slot of the sub-frame the physical resource block pairs of which are comprised on the downlink grant search space and that have an even or odd physical resource block pair index. Alternatively, control signaling may be used to signal whether the even or odd physical resource block pair index/indices for the uplink grant search space.

Another exemplary implementation may be that the uplink grant search space consists of the physical resource blocks in the second slot of the sub-frame of a configurable number of physical resource block pairs comprised in the downlink grant search space. The number may be configured by control signaling or may alternatively pre-defined.

In one further exemplary embodiment, the search space for downlink grants may be defined in resource block group units. Optionally, also the downlink resource allocation (downlink grants—e.g. R-PDCCH) may allocate the downlink resources (e.g. R-PDSCH) in resource block group units. In this exemplary embodiment, the downlink grant search space is formed by the physical resource blocks of at least one resource block group, and the uplink grant search space formed by a subset of the physical resource blocks of the second slot of the sub-frame located within said of at least one resource block group.

In an exemplary variation of this embodiment, the downlink grant comprises a bit-map. Each bit position of the bit-map being associated to a physical resource block group and is indicting whether the respective associated physical resource block group is allocated to the reception apparatus for downlink data transmission. The resource block group comprising the downlink grant is considered to be always allocated to the reception apparatus. Accordingly, the bit of the bit-map associated to the resource block group comprising the downlink grant is used as an indicator for indicating whether there is data mapped to the uplink grant search space within the resource block group comprising the downlink grant or not.

Furthermore, in another variation of the embodiment, the reception apparatus receives, according to the detected downlink grant, downlink data on the physical resources of the resource block group comprising the downlink grant which are not used for the signaling of the downlink grant, if it is determined based on a downlink grant received in the downlink grant search space that there is no data mapped to the uplink grant search space of the resource block group comprising the downlink grant.

If it is determined based on a downlink grant received in the downlink grant search space that there is no data mapped to the uplink grant search space of the resource block group comprising the downlink grant, the reception apparatus may receive, according to the detected downlink grant, downlink data for the reception apparatus on the physical resources of the resource block group comprising the downlink grant which are not used for the signaling of the downlink grant and which are not located in the uplink grant search space.

In line with the third aspect of the invention, a another embodiment of the invention is providing a control channel signal for granting downlink resources to a reception apparatus (e.g. a downlink grant, DCI format for granting downlink resources, PDCCH, or R-PDCCH). The control channel signal comprises a resource allocation field for incorporating a bit-map, each bit position of the bit-map being associated to a physical resource block group of a sub-frame and indicating whether the respective associated physical resource block group is allocated to a reception apparatus for downlink data transmission. The control channel signal always allocates the resource block group on which the control channel signal is transmitted to the reception apparatus to the reception apparatus, and the bit of the bit-map associated to the resource block group comprising the control channel signal is used as an indicator for indicating to the reception apparatus whether there is data for the reception apparatus mapped to the uplink grant search space within the resource block group comprising the control channel signal or not.

Further embodiments of the invention relate to the implementation of the aspects of this invention in hardware and/or software. One embodiment of the invention is related to a transmission apparatus comprising a processing section for generating a control channel signal, and further a transmitter section for transmitting the control channel signal to a reception apparatus.

Another embodiment relates to a reception apparatus for detecting at least one of a downlink grant and an uplink grant within a sub-frame of a OFDM-based mobile communication system. The reception apparatus comprises a receiver section for receiving a sub-frame from a base station, wherein the sub-frame is logically divided into physical resource block pairs, and a respective resource block pair consisting of a resource block within a first slot of the sub-frame and a resource block within a second slot of the sub-frame, and a decoding section for performing a blind detection for a downlink grant within a downlink grant search space of the sub-frame, wherein the downlink grant search space consists of plural physical resource blocks of resource block pairs within the first slot of the sub-frame. Furthermore, the decoding section of the reception apparatus further performs a blind detection for an uplink grant within an uplink grant search space of the sub-frame, wherein the uplink grant search space consists of a subset of the physical resource blocks within the second slot of the sub-frame located within the physical resource block pairs the physical resource blocks of which form the downlink grant search space.

A further alternative embodiment of the invention, relates to a reception apparatus for detecting at least one of a downlink grant and an uplink grant within a sub-frame of a OFDM-based mobile communication system. This reception apparatus comprises a receiver section for receiving a sub-frame from a base station, wherein the sub-frame is logically divided into physical resource block pairs, and a respective resource block pair consisting of a resource block within a first slot of the sub-frame and a resource block within a second slot of the sub-frame, and a decoding section for performing a blind detection for a downlink grant within a downlink grant search space of the sub-frame, wherein the downlink grant search space consists of plural physical resource blocks within the first slot of the sub-frame. Moreover, the reception apparatus comprises a processing section for determining based on the downlink grant, whether there is data mapped to the uplink grant search space of the sub-frame. The decoding section of the reception apparatus further performs a blind detection for an uplink grant within an uplink grant search space of the sub-frame, if it is determined that no data mapped to the uplink grant search space of the sub-frame. The uplink grant search space consists of a subset of the physical resource blocks within the second slot of the sub-frame located within the physical resource block pairs the physical resource blocks of which form the downlink grant search space.

Another exemplary embodiment of the invention is providing a computer readable medium storing instructions that, when executed by a processor of a reception apparatus, cause the reception apparatus to detect at least one of a downlink grant and an uplink grant within a sub-frame of a OFDM-based mobile communication system, by receiving a sub-frame from a base station, wherein the sub-frame is logically divided into physical resource block pairs, and a respective resource block pair consisting of a resource block within a first slot of the sub-frame and a resource block within a second slot of the sub-frame, performing a blind detection for a downlink grant within a downlink grant search space of the sub-frame, wherein the downlink grant search space consists of plural physical resource blocks of resource block pairs within the first slot of the sub-frame, and performing a blind detection for an uplink grant within an uplink grant search space of the sub-frame, wherein the uplink grant search space consists of a subset of the physical resource blocks within the second slot of the sub-frame located within the physical resource block pairs the physical resource blocks of which form the downlink grant search space.

The computer readable medium according to another embodiment of the invention is storing instructions that, when executed by a processor of a reception apparatus, cause the reception apparatus to detect at least one of a downlink grant and an uplink grant within a sub-frame of a OFDM-based mobile communication system, by receiving a sub-frame from a base station, wherein the sub-frame is logically divided into physical resource block pairs, and a respective resource block pair consisting of a resource block within a first slot of the sub-frame and a resource block within a second slot of the sub-frame, performing a blind detection for a downlink grant within a downlink grant search space of the sub-frame, wherein the downlink grant search space consists of plural physical resource blocks within the first slot of the sub-frame, and determining based on the downlink grant, whether there is data mapped to the uplink grant search space of the sub-frame, and, if it is determined that no data mapped to the uplink grant search space of the sub-frame, performing a blind detection for an uplink grant within an uplink grant search space of the sub-frame. In this embodiment, the uplink grant search space consists of a subset of the physical resource blocks within the second slot of the sub-frame located within the physical resource block pairs the physical resource blocks of which form the downlink grant search space.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
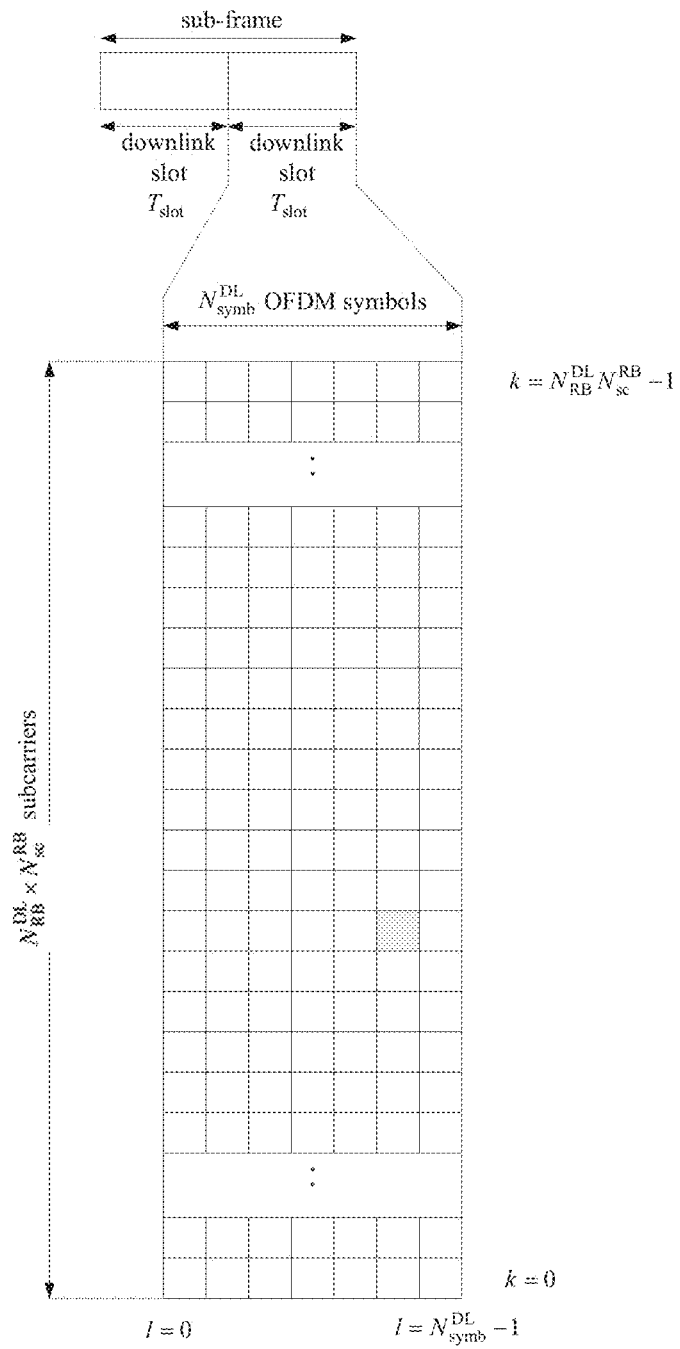
FIG. 1 shows the general structure of a sub-frame on a downlink component carrier as defined for 3GPP LTE (Release 8)

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network. The aspects of the invention described herein may be inter alia used for defining the search spaces for uplink and downlink grants (R-PDCCHs) for relay nodes in a 3GPP LTE-A (Release 10) communication systems and for providing an effective resource utilization in terms of R-PDCCH and R-PDSCH data being mapped to a downlink search space (in particular to individual resource block groups thereof).

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network A first aspect of the invention is to suggest a new design of the uplink grant search space within a sub-frame: The uplink grant search space is defined as a subset of the downlink grant search space. In terms of frequency resources, i.e. in the frequency domain, the uplink grant search space is defined on a subset of the resource block pairs that form the downlink search space. Please note that in the time domain, the downlink grant search space may for example consist of physical resource blocks of the sub-frame within the first slot of the sub-frame, while the uplink grant search space may for example consist of physical resource blocks of the sub-frame within the second slot of the sub-frame. Hence, when stating that the uplink grant search space is a subset of the downlink grant search space, this refers to the definition of the two search spaces in the frequency domain, while they may be distinct in the time domain.

In terms of frequency, the uplink grant search space is thus always comprising a subset of subcarriers of the physical resource blocks of the sub-frame that form the downlink grant search space (e.g. irrespective of location in the frequency domain of the physical resource blocks). Please note that it is also generally possible to define a localized search space for the downlink grants, e.g. by defining the downlink grant search space to span adjacent physical resource blocks in the frequency domain or in a more detailed implementation as the physical resource blocks (in the first slot of the sub-frame) belonging to one or more resource block groups. A localized definition of the search space may be beneficial for frequency selective scheduling.

Alternatively, the downlink grant search space may also be defined in a distributed fashion, i.e. the physical resource blocks (in the first slot of the sub-frame) forming the downlink grant search space may be distributed—for example spaced by some given interval—in the frequency range of the sub-frame. For example, the physical resource blocks (in the first slot of the sub-frame) forming the downlink grant search space could be located in different resource block groups. Also a mix of the distributed and localized approach would be possible, for example, when defining the downlink grant search space in terms of non-adjacent resource block groups.

Irrespective of the configuration of the downlink grant search space, the uplink grant search space is defined relative thereto as a subset. For example, the uplink grant search space may be (approx.) ½ of the size of the downlink grant search space, i.e. consists of (approx.) ½ of the number of resource blocks of the downlink grant search space.

The configuration of the uplink grant search space according to the first aspect of the invention allows downlink data to be mapped to the remaining resources outside the uplink grants search space and the resources used for a downlink grant (or downlink grant search space, depending on the implementation). Furthermore, by reducing the size of the uplink grant search space, the number of blind decoding attempts can be reduced as there are less candidate locations for resource allocations possible within the sub-frame. In addition, the definition of the uplink grant search space as only covering a subset of the downlink grant search space with respect to the frequency domain, allows further to simultaneously send an uplink grant and a downlink grant and the corresponding downlink data on the resource block pairs of the physical resource blocks belonging to the downlink grant search space—as will become more apparent from the following description.

Furthermore, according to another, second, aspect of the invention, which is providing an alternative implementation to the first aspect, the downlink grants comprise an indication of whether the uplink grant search space in the sub-frame comprises (user) data or not. This may be also viewed as the downlink grants indicating whether the second slot comprises an uplink grant search space or not. Accordingly, if the downlink grant indicates that there is (user) data mapped to the uplink grant search space, the reception apparatus (e.g. a relay node or a mobile terminal) does not perform a blind detection for an uplink grant in the uplink grant search space.

This way, it becomes possible to unambiguously define/indicate the utilization of the resources of the physical resource block pairs belonging to the downlink grants search space, so that uplink grants and downlink data may be both mapped to the second slot and no resources need to be wasted. This second aspect is inter alia and for example useful, when the downlink grants imply an allocation of all resources of the physical resource block pairs the resource blocks of which belong to the downlink grant search space (except for the resources of the downlink grant or the downlink grant search space). In an exemplary implementation of the second aspect of the invention, the reception apparatus assumes that a downlink grant allocates the resources in the uplink grant search space to the reception apparatus for (user) data transmission, in case the downlink grant indicates that (user) data is mapped to the uplink grant search space. However, the resources of the uplink grant search space within the sub-frame may also be used otherwise, e.g. assigned to another reception apparatus.

In one further exemplary implementation pertaining to both, the first and the second aspect mentioned above, the uplink grant search space is further dynamically determined by the reception apparatus based on the blind detection result performed on the downlink grant search space. For example, if a downlink grant is detected in the downlink grant search space by the reception apparatus, the uplink grant search space may be different (e.g. smaller than) the uplink grant search space assumed by the reception apparatus, in case the reception apparatus does not detect a downlink grant in the downlink grant search space. Hence, the size of the uplink grant search space may be dynamic in terms of being dependent on the presence of a downlink grant in the downlink grant search space of the sub-frame.

A further, third aspect of this invention is suggesting a control channel signal format for signaling a downlink grant that is capable of indicating whether downlink data has been mapped to the reception apparatus' uplink grant search space. This format is a backward compatible format, which is providing a new interpretation of the resource assignment field. Commonly, the resource assignment field of the control channel signal format (for example DCI format defining a downlink grants (R-PDCCH)) may comprise a bit-map, each bit of which being linked to a resource block (or resource block group) index, and indicating whether the respective resource block (or resource block group) corresponding to the respective bit position in the bit-map is assigned to the reception apparatus or not.

According to the third aspect it is assumed that the resource blocks of the physical resource block pairs (or resource block group) that are signaling a downlink grant in the first slot of the sub-frame are (is) allocated to the reception apparatus. The bit of the bit-map in the resource assignment field associate to the resource blocks (or resource block group) signaling the downlink grant is used to signal, whether the data is mapped also to the uplink grant search space in the second slot of the sub-frame, or not, i.e. whether the reception apparatus needs to perform a blind detection for an uplink grant in the second slot or not. Hence, if the reception apparatus is allocated resources on a per-RBG basis, the bit of the bit-map in the resource assignment field of the downlink grant associated to the resource block group comprising the downlink grant is used as an indicator for indicating to the reception apparatus whether there is data for the reception apparatus mapped to the uplink grant search space within the resource block group comprising the control channel signal or not.

Figure 13:
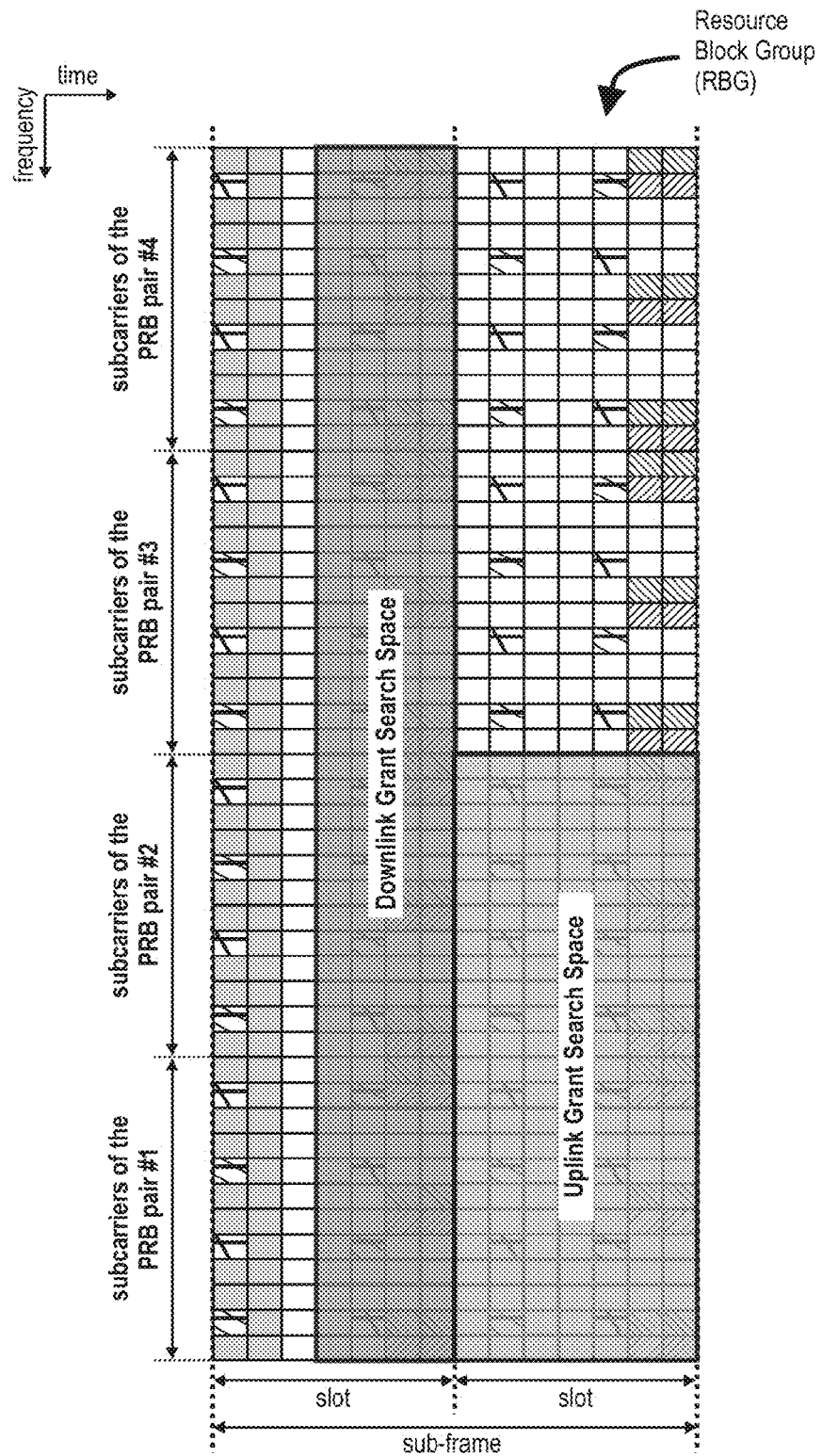
FIG. 13 shows an exemplary definition of a downlink grant search space (DL Grant Search Space) and an uplink grant search space (UL Grant Search Space) within a resource block group of sub-frame according to an embodiment of the invention, FIG. 14 exemplarily highlights the resource utilization of a resource block group in which a downlink grant is signaled, when employing the definition of the downlink grant search space and the uplink grant search space as shown in FIG. 13, FIG. 15 exemplarily highlights the resource utilization of a resource block group in which a downlink grant is signaled, when employing a dynamic determination of the uplink grant search space, according to an exemplary embodiment of the invention.

FIG. 13 shows a resource block group (RBG) of a downlink sub-frame, where the downlink grant search space and the uplink grant search space is configured according to an aspect of the invention, i.e. the uplink grant search space is defined as a subset of the downlink grant space in terms of frequency domain resources. For exemplary purposes only, FIG. 13 shows a RBG of a 3GPP LTE-A sub-frame structure, where the slot boundary is separating the downlink grant search space and the uplink grant search space. Please note that the downlink grant search space may not cover the entire OFDM symbols of the first slot, but only a subset thereof as indicated in FIG. 13. Generally, the downlink grant search space and the uplink grant search space may be defined on more than one single RBG or may also be defined on a physical resource block (PRB) basis.

Figure 17:
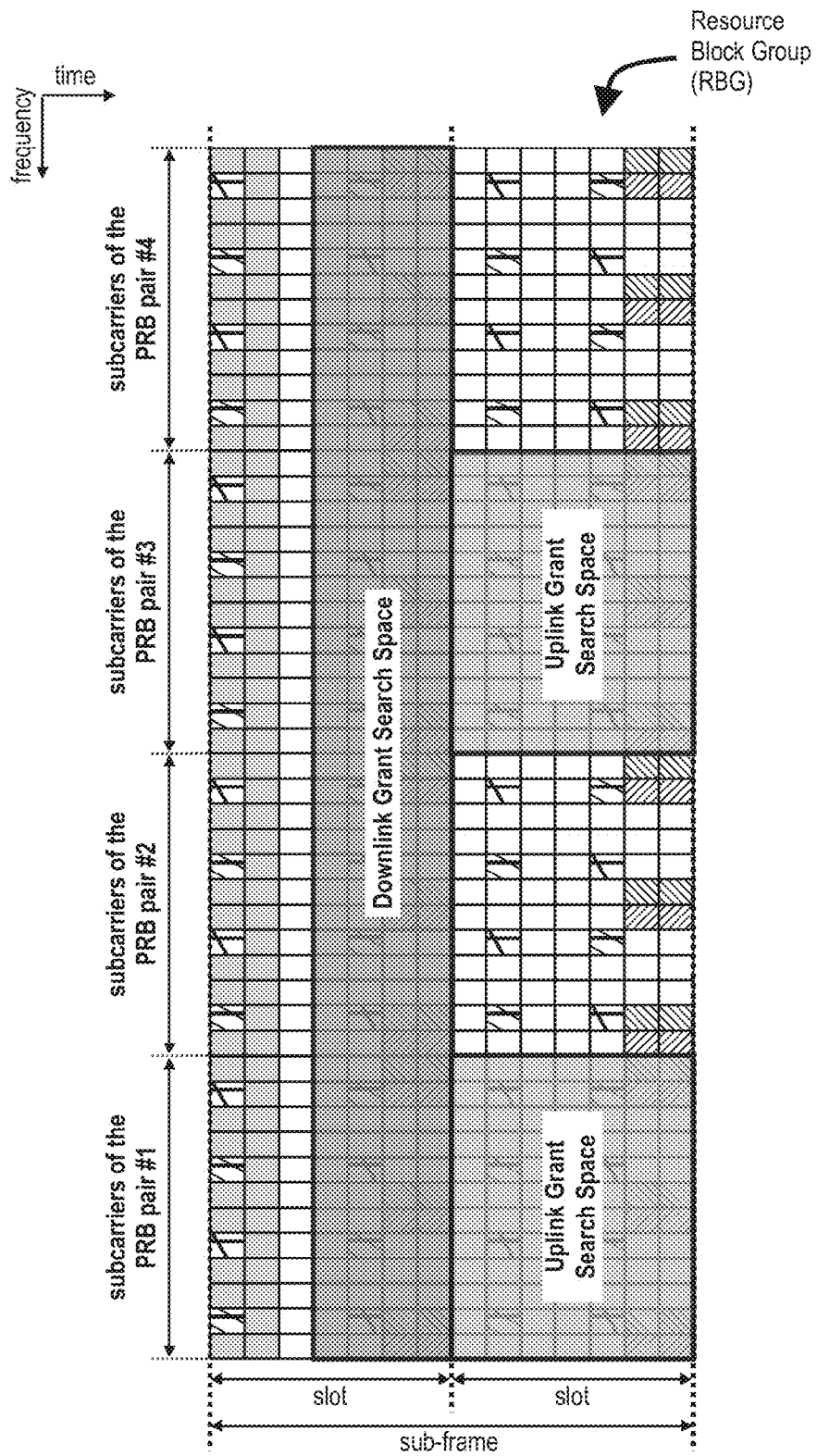
FIG. 17 shows another exemplary definition of an uplink grant search space relative to a downlink grant search space according to another embodiment of the invention.

Moreover, it should also be noted that the number of PRB pairs in a RBG may depend on the system bandwidth. In the example of FIG. 13, four PRB pairs are forming the RBG, but a RBG may also be defined as three or two PRB pairs (or one single PRB pair). According to FIG. 13, the search space for uplink grant is defined as a subset of downlink grant search space in terms of their PRB index. The location of uplink grant search space may be for example predefined within the PRB indices that belong to downlink grant search space. For example, as shown in FIG. 13 uplink grant search space occupies the PRBs within the RBG belonging to the two lowest PRB indices (#1 and #2) of the PRBs defining the downlink grant search space. Please note that the uplink grant search space may also be defined on the two highest PRB indices (#3 and #4) of the PRBs defining the downlink grant search space, on the odd PRB indices (#1 and #3) as shown in FIG. 17 or on the even PRB indices (#2 and #4), etc. of the RBG.

Figure 11:
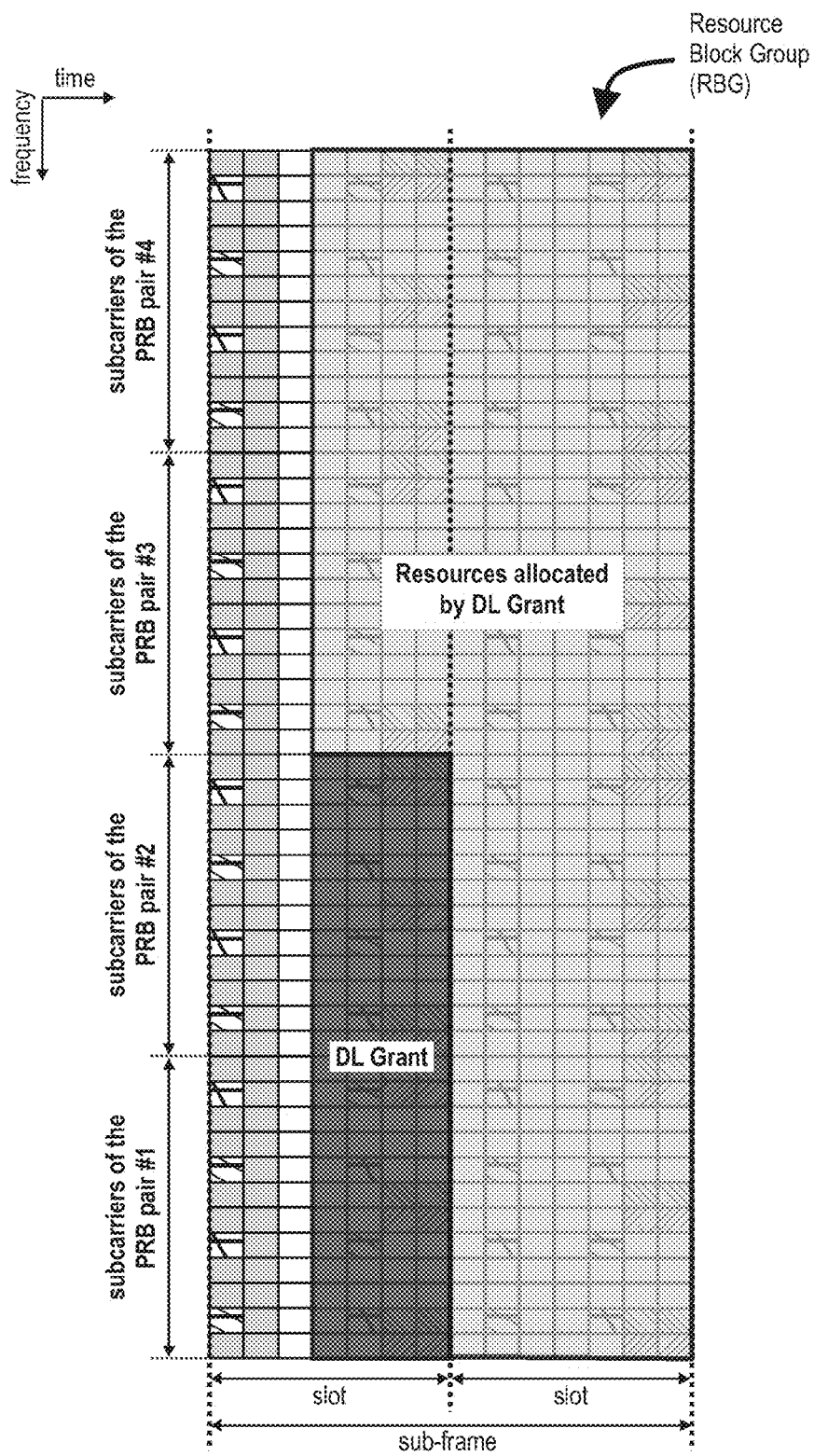
FIGS. 11 & 12 show the possible resource utilizations of an resource block group of sub-frame using the definition of the downlink grant search space and the uplink grant search space as shown in FIG. 12.
Figure 12:
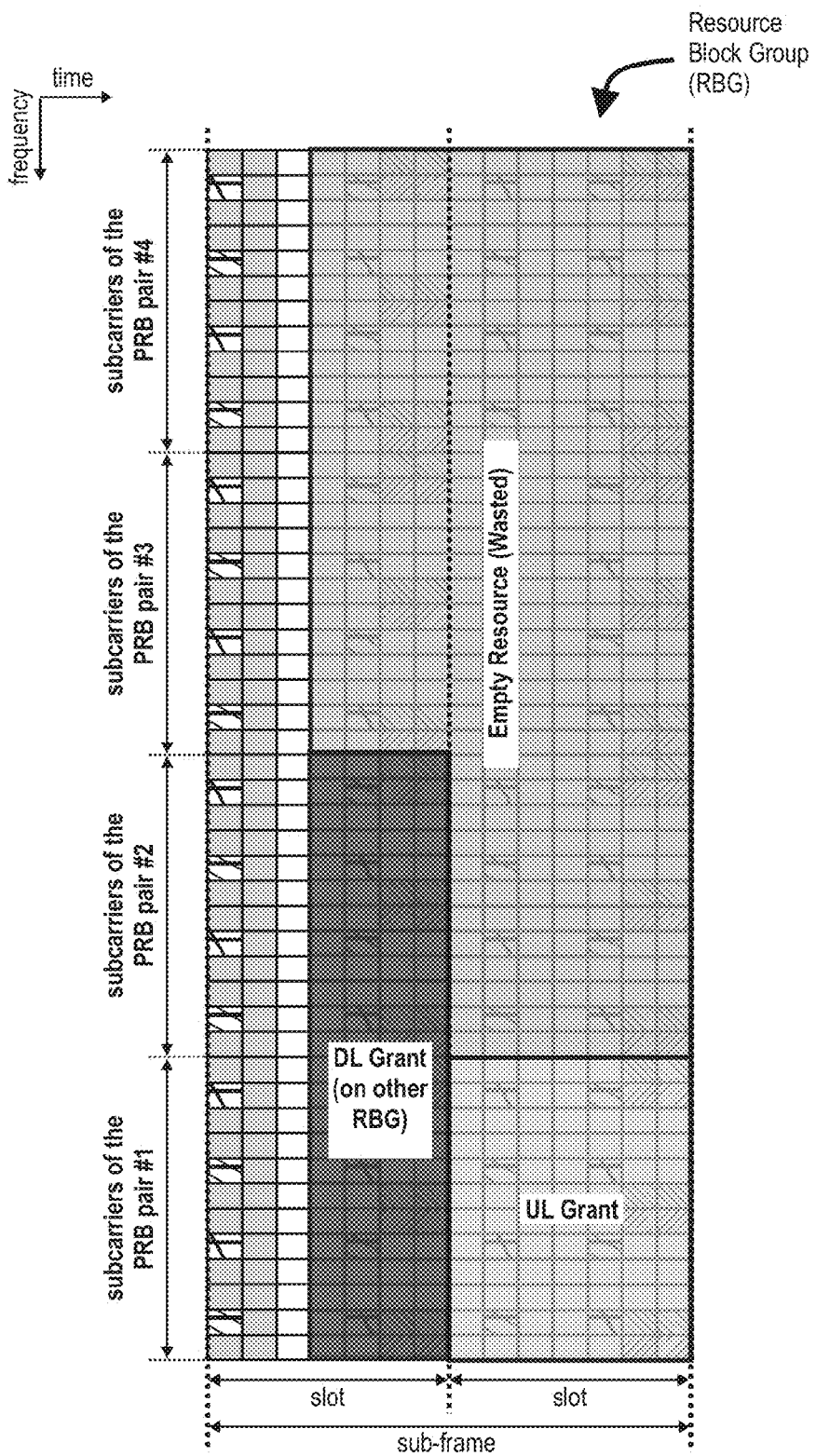
Figure 14:
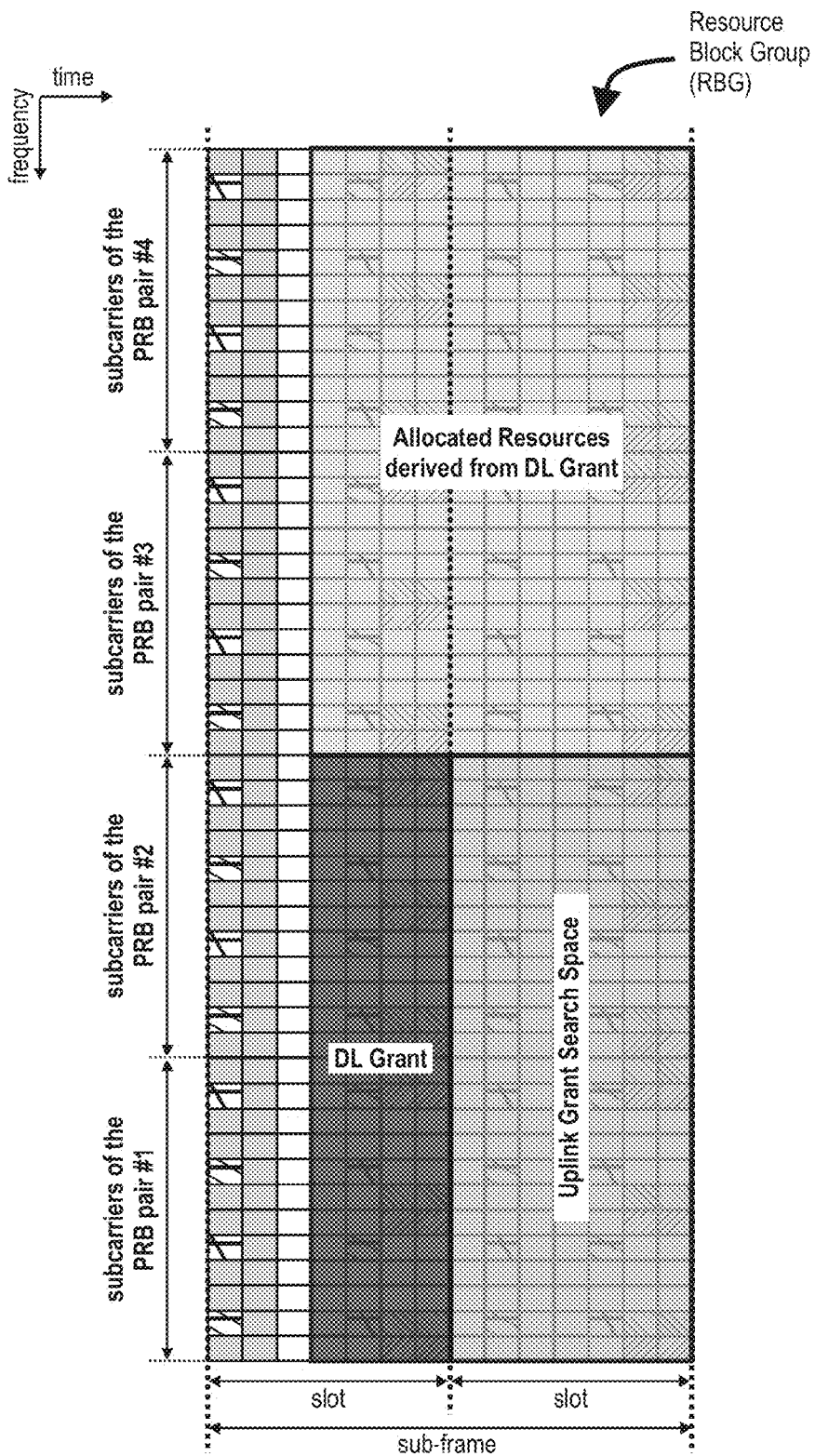

As can be seen in FIG. 14, the new proposed configuration of the uplink grant search space as a subset of the downlink grant search space allows to allocate the resources not falling into the uplink grant search space to a reception apparatus (e.g. a relay node) for the reception of downlink data. Hence, these "left-over" resources of the RBG can be used for a downlink data channel, e.g. the R-PDSCH for a relay node. Please note that in the example shown in FIG. 14, the resource blocks of the downlink grant search space (the PRBs of PRB indices #3 and #4 in the first slot) are also considered part of the allocated downlink resource. Optionally, only the resource blocks of the second slot (the PRBs of PRB indices #3 and #4 in the second slot) of the sub-frame not located in the uplink grant search space are allocated by the downlink grant. Please note that in the example given with respect to FIG. 11 or FIG. 12, it has not been possible to map downlink data to the RBG and to simultaneously have an uplink grants search space, respectively signal an uplink grant in the same RBG.

Please note that in one exemplary implementation, it is assumed that the downlink data channel (e.g. R-PDSCH) is assigned to the reception apparatus (e.g. relay node) on a per-RBG basis. Hence, in the example above, the downlink grant may either imply the allocation of the "left-over" resources of the RBG containing the downlink grant to the reception apparatus (i.e. no explicit indication of the physical resources is required in the downlink grant).

Figure 15:
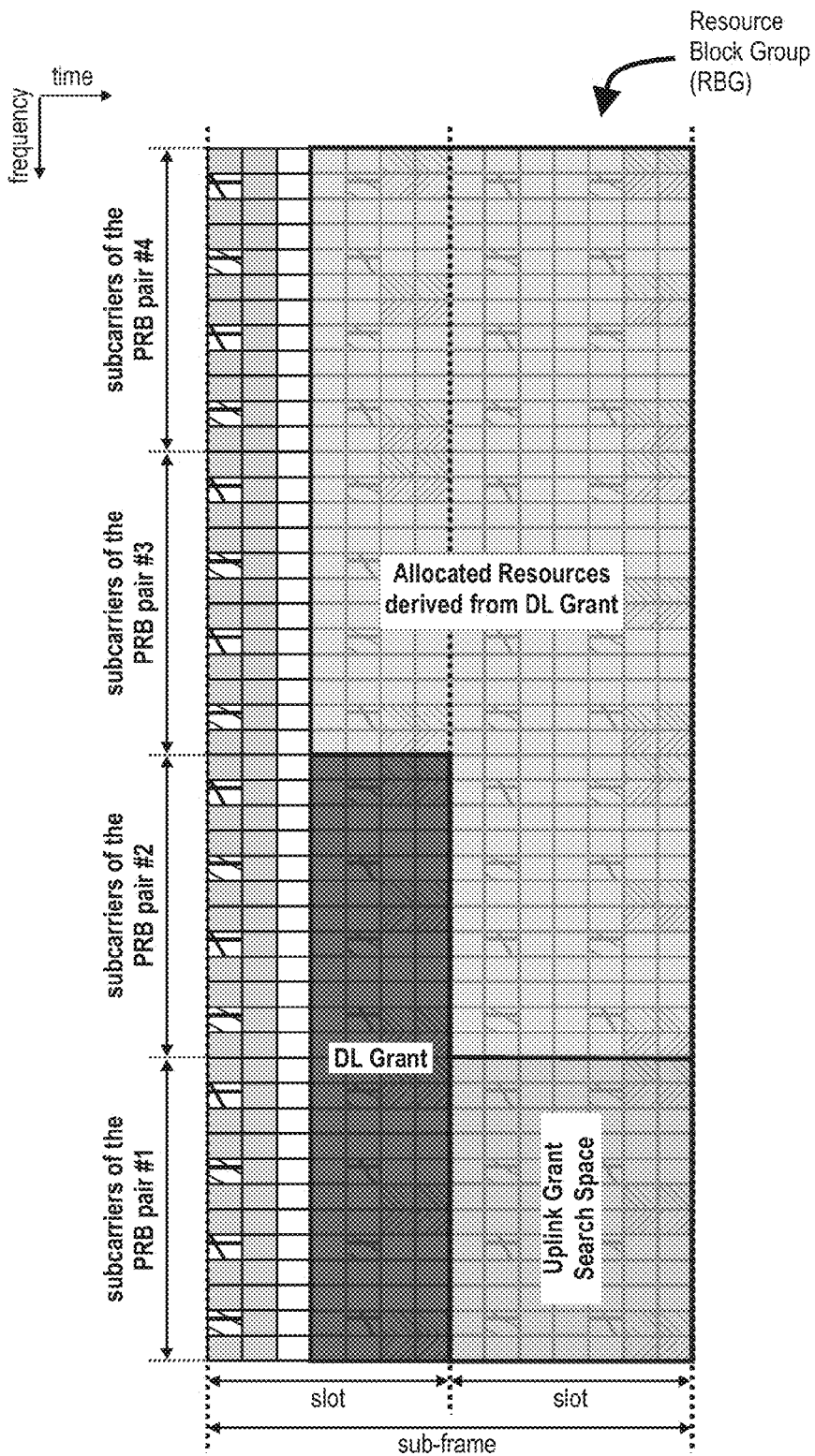

Furthermore, in a more advanced implementation, the size of the uplink grant search space may be further dynamic. An exemplary implementation according to a further embodiment of the invention will be outlined with respect to FIG. 15. The downlink grant search space and the default uplink grant search space are configured as shown in FIG. 13. In case the reception apparatus detects a downlink grant in the downlink grant search space, the reception apparatus will further reduce the size of the uplink grant search space to a subset of the default uplink grant search space (in terms of the frequency domain resources). This is shown in FIG. 15, where the downlink grant is signaled on the PRBs #1 and #2 of the first slot of the sub-frame, the blind detection of which at the reception apparatus will cause the reception apparatus to further reduce the size of the uplink grant search space. In the example shown in FIG. 15, upon detection of the downlink grant granting resources in the RBG, the reception apparatus will assume the uplink grant search space to consist of only the PRB with index #1 in the second slot of the sub-frame and will perform a blind detection for an uplink grant only on this "reduced" uplink grant search space. Accordingly, the remaining PRBs with indices #2, #3 and #4 in the second slot can be allocated (together with the PRBs with indices #3 and #4 in the first slot of the sub-frame) can be considered to carry the downlink data for the reception apparatus (e.g. the R-PDSCH data). The blind detection for uplink grants will then be performed on the dynamically determined uplink grant search space.

If the reception apparatus is not detecting a downlink grant in the downlink search space of the RBG (or it detects a downlink grant allocating resources on (a)nother RBG(s)), the reception apparatus assumes the default uplink grant search space, as shown in FIG. 13 and performs a blind detection of an uplink grant therein.

According to an embodiment of the invention, it may be assumed by the reception apparatus that the detection of a downlink grant on in the downlink grant search space allocates the entire physical resources of the RBG (strictly speaking the resources within the downlink and uplink grant search space within the RBG) to the reception apparatus, except for those physical resources used for uplink grant search space and the physical resource blocks used for the downlink grant—note that alternatively, it may be assumed by the reception apparatus that the detection of a downlink grant on in the downlink grant search space allocates the entire physical resources of the RBG within the second slot to the reception apparatus, except for those physical resources used for uplink grant search space.

In line with the second aspect of the invention, and in a further embodiment of the invention, the downlink grant may comprise an indication, whether there is downlink data for the reception apparatus mapped to the uplink grant search space in the second slot or not. If downlink data is mapped to the uplink grant search space, the reception apparatus assumes that the downlink data is mapped to the resource elements of the RBG in the second slot. Otherwise, it assumes that the downlink data is mapped to the resource elements of the RBG in the second slot, except for those of the uplink grant search space. Please note that also in this example, the uplink grant search space may be determined dynamically, as described before.

Figure 16:
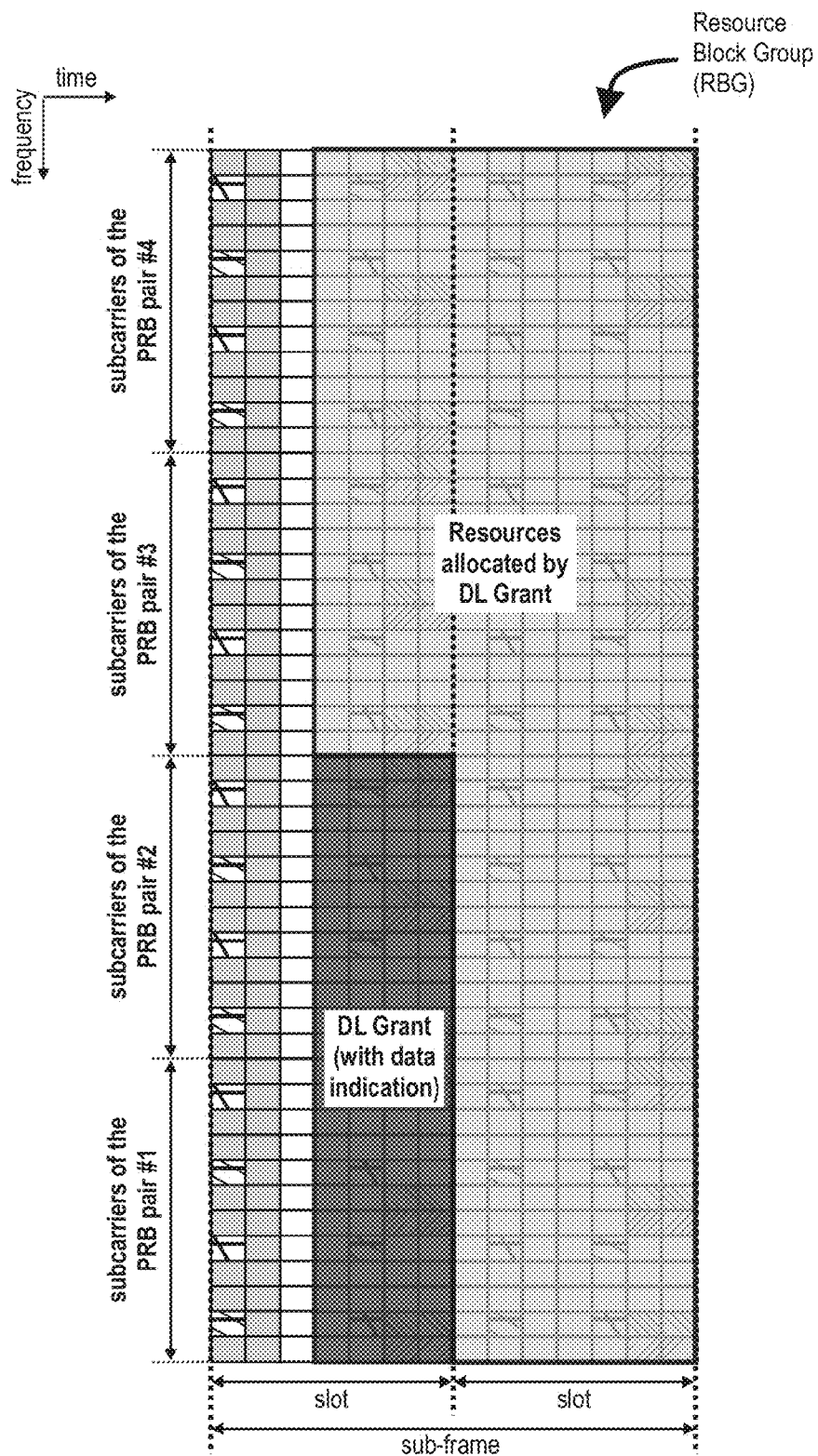
FIG. 16 shows, according to an embodiment of the invention, an exemplary resource utilization of a resource block group in which a downlink grant is signaled, wherein the downlink grant comprises an indicator for indicating whether data is mapped to the uplink grant search space of the resource block group as shown in FIG. 14 or FIG. 15.

Essentially, if the downlink grant indicates no data is mapped to the uplink grant search space, the reception apparatus assumes the downlink data to be mapped to the RBG resource elements as shown in FIG. 14 or FIG. 15. If data is mapped to the uplink grant search space according to the indication in the downlink grant, the reception apparatus assumes the downlink data to be mapped to the RBG resource elements as shown in FIG. 16 and demodulates and decodes the modulation symbols on the resource elements accordingly. Hence, in this exemplary implementation, the indication in the downlink grant allows to use the entire resource of the second slot of the RBG for a downlink data channel (e.g. R-PDSCH data).

In one exemplary embodiment of the invention, the indication of whether data is mapped to the uplink grant search space comprised within the downlink grant is realized by means of a bit-map. The downlink grant may for example comprise a resource allocation field that comprises this bit-map. Each bit position of the bit-map is associated to a physical resource block group and is indicating whether the respective associated physical resource block group is allocated to the reception apparatus for downlink data transmission or not. As mentioned before, in this example, the resource block group comprising the downlink grant is always allocated to the reception apparatus. The bit of the bit-map associated to the resource block group comprising the downlink grant is used as an indicator for indicating whether there is data mapped to the uplink grant search space within the resource block group comprising the downlink grant or not. For example, if the bit associated to the resource block group comprising the downlink grant is set (e.g. is 1), this is indicating to the reception apparatus that there is data mapped to the PRB(s) defining the uplink grant search space (see FIG. 16). Accordingly, no blind detection for an uplink grant may need to be performed. Otherwise, if the bit associated to the resource block group comprising the downlink grant is not set (e.g. is 0), this is indicating to the reception apparatus that there is no data mapped to the PRB(s) defining the uplink grant search space. Hence, the downlink data is mapped to the PRBs of the RBG as for example shown in FIG. 14 or FIG. 15. In this case the reception apparatus also performs a blind detection for an uplink grant in the uplink grant search space.

Figure 18:
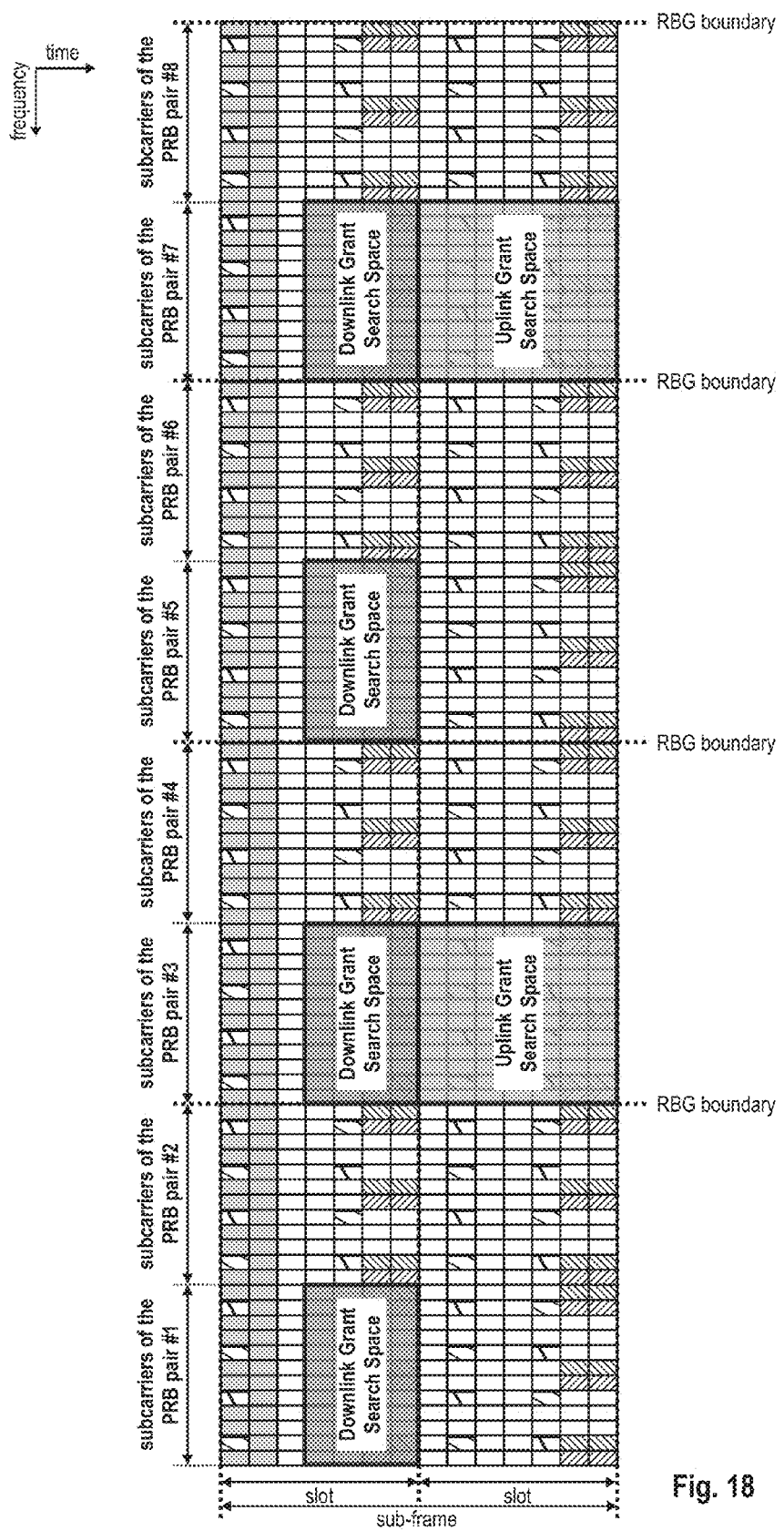
FIG. 18 shows an definition of an exemplary a downlink grant search space (DL Grant Search Space) and an uplink grant search space (UL Grant Search Space) according to an exemplary embodiment of the invention, where the downlink grant search space and the uplink grant search space are defined in physical resource block units.

In the examples outlined above with respect to FIGS. 13 to 16, it has been assumed that the downlink grant search space and allocation of resources in performed on a per-RBG basis, and that optionally also the resource allocation to the reception apparatus is performed on a per-RBG basis. Please note that this is only exemplary. It is likewise possible to define the downlink grant search space on per-PRB basis, i.e. as a set of PRB indices instead of a set of RBG indices. Similarly, also in this example the uplink grant search space can be defined as a subset of the downlink grant search space in the frequency domain. Hence, in this case the uplink grant search space will be formed by a subset of physical resource blocks in the second slot of a of the physical resource block pairs the physical resource blocks of which in the first slot form the downlink grant search space. A purely illustrative example is shown in FIG. 18, where four physical resource blocks (indices #1, #3, #5 and #7) in the first slot of the sub-frame, belonging to different resource block groups are forming the downlink grant search space, while the physical resource blocks in the second slot that form the uplink grant search space are a subset of four the adjacent physical resource blocks (indices #3 to #5) in the frequency domain.

Figure 19:
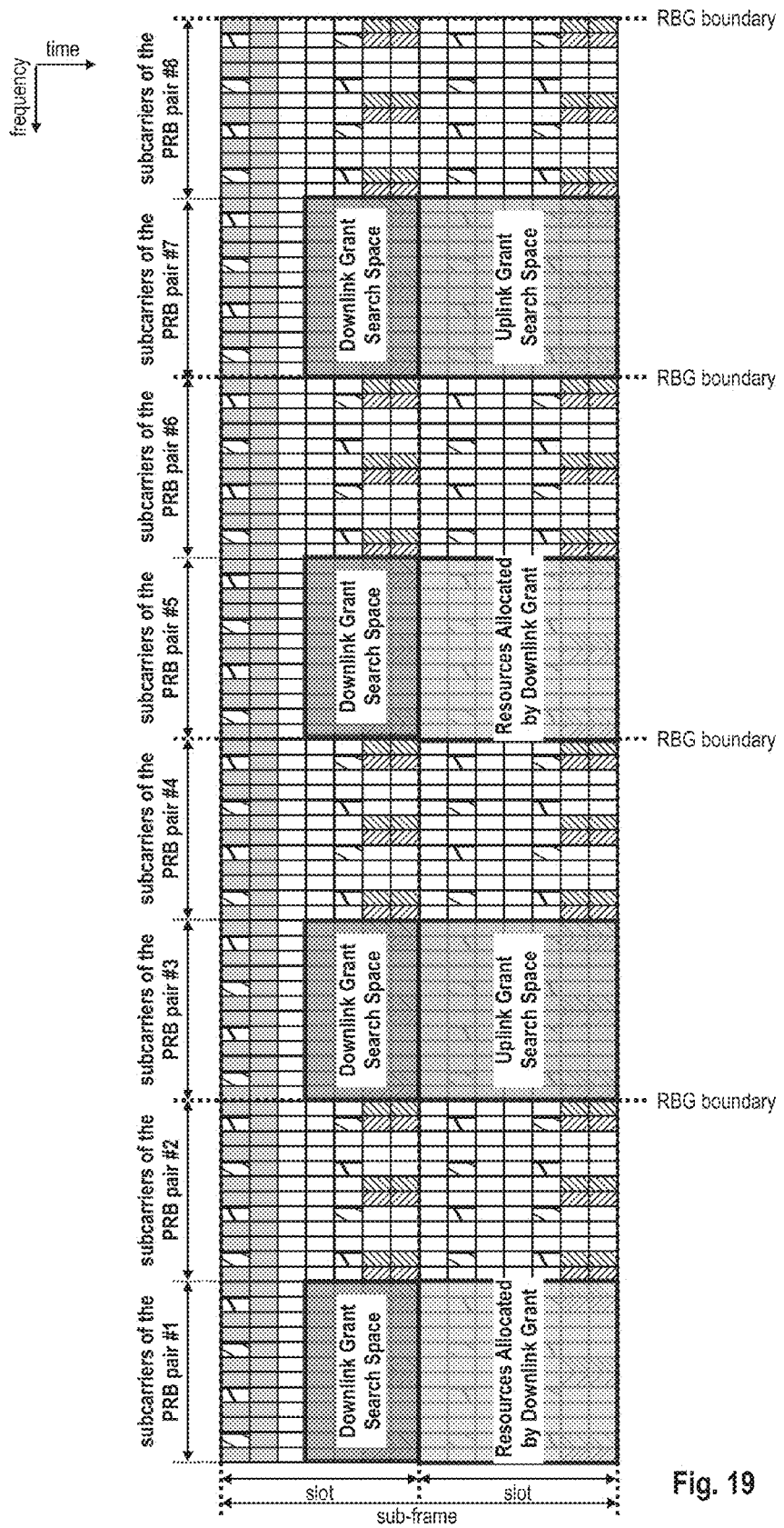
FIG. 19 shows an exemplary resource utilization of a per-resource block resource allocation of a downlink grant comprised within the downlink grant search space as shown in FIG. 18, according to an embodiment of the invention.

Also physical resource allocation by a downlink grant can be realized. A downlink grant in the downlink grant search space, as shown in FIG. 19 (please note that here a single downlink grant is sent on four PRBs), may allocate resources to the reception apparatus on a per-PRB level. For example, the downlink grant indicates the PRB(s) in each RBG that are allocated to the reception apparatus. This way, it is theoretically possible to avoid an overlap of the resource allocation for the data channel (e.g. R-PDSCH) and the uplink grant search space. However, even if there is an overlap, the downlink grant could for example indicate whether the allocated resource element in the RBGs that are located in the uplink grant search space are used for transmission of data to the reception apparatus or as an uplink grant search space. The reception apparatus may adapt to the indication and may either try to detect an uplink grant in the uplink grant search space, or may detect data on the resource blocks of the uplink grant search space. In the example shown in FIG. 19, the reception apparatus receives downlink data on resource blocks #1, #5, #9, #11, #13, . . . while it tries to blind detect an uplink grant on resource blocks #3 and #7 of the second slot.

Please note that also in case the search space for downlink grants is defined in units of physical resource blocks (or their indices in the frequency domain), it is of course also possible to dynamically adjust the size of the uplink grant search space and/or to include an indication to the downlink grant, whether the is data mapped to the uplink grant search space, similar to the examples discussed with respect to FIGS. 13 to 16 above.

Figure 20:
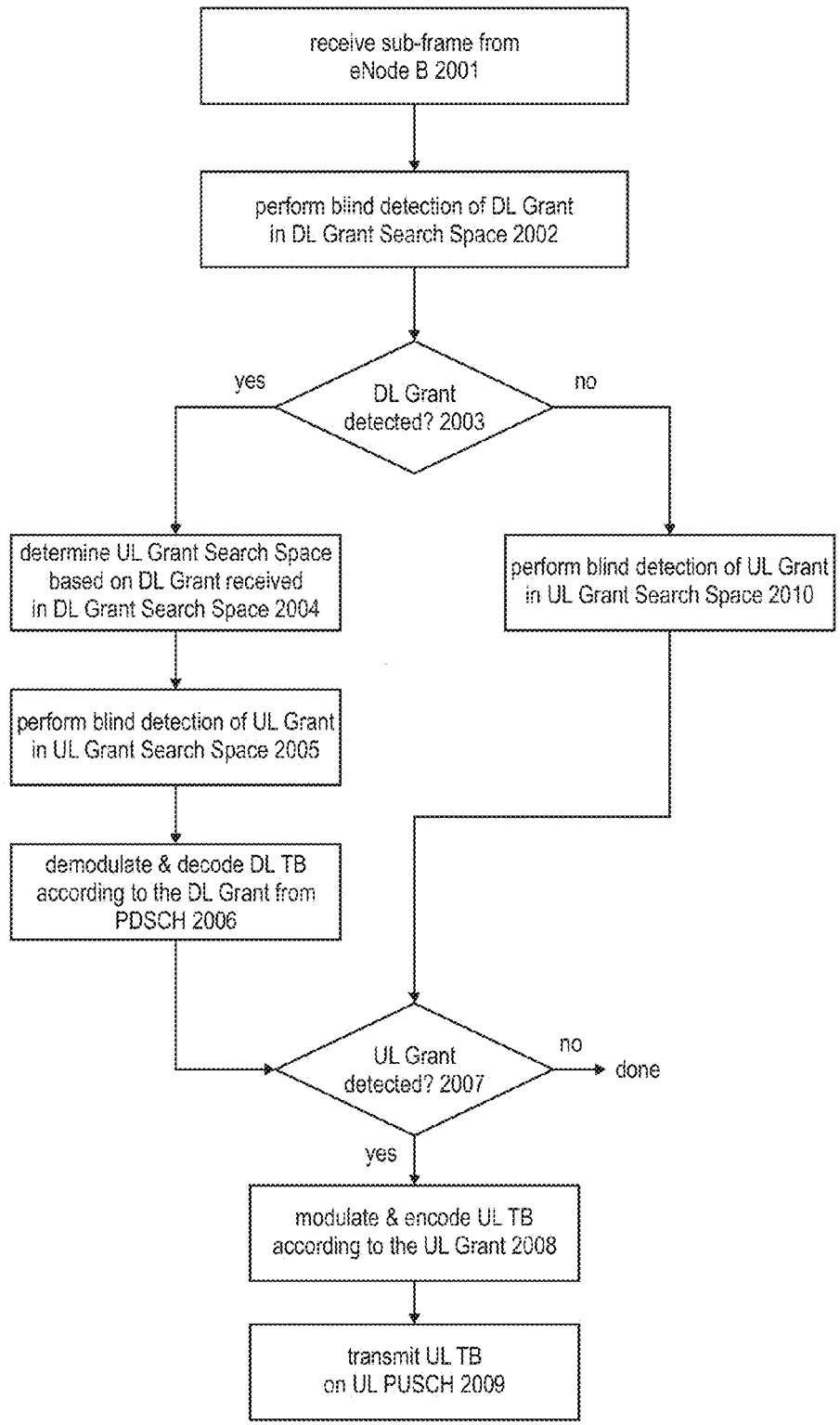
FIGS. 20 & 21 show exemplary flow charts according to different embodiments of the invention, describing the operation of a reception apparatus, and FIG. 22 exemplifies, according to an embodiment of the invention, an a resource utilization of a resource block groups in which a downlink grants of multiple reception apparatuses are interleaved.

FIG. 20 shows a flow chart of the operation of a reception apparatus according to an exemplary embodiment of the invention. The reception apparatus receives 2001 a sub-frame from a base station (eNode B or Node B in the 3GPP terminology). The reception apparatus may be for example a relay node or a mobile terminal (user equipment in the 3GPP terminology). The sub-frame may consist of a number of OFDM symbols.

Figure 2:
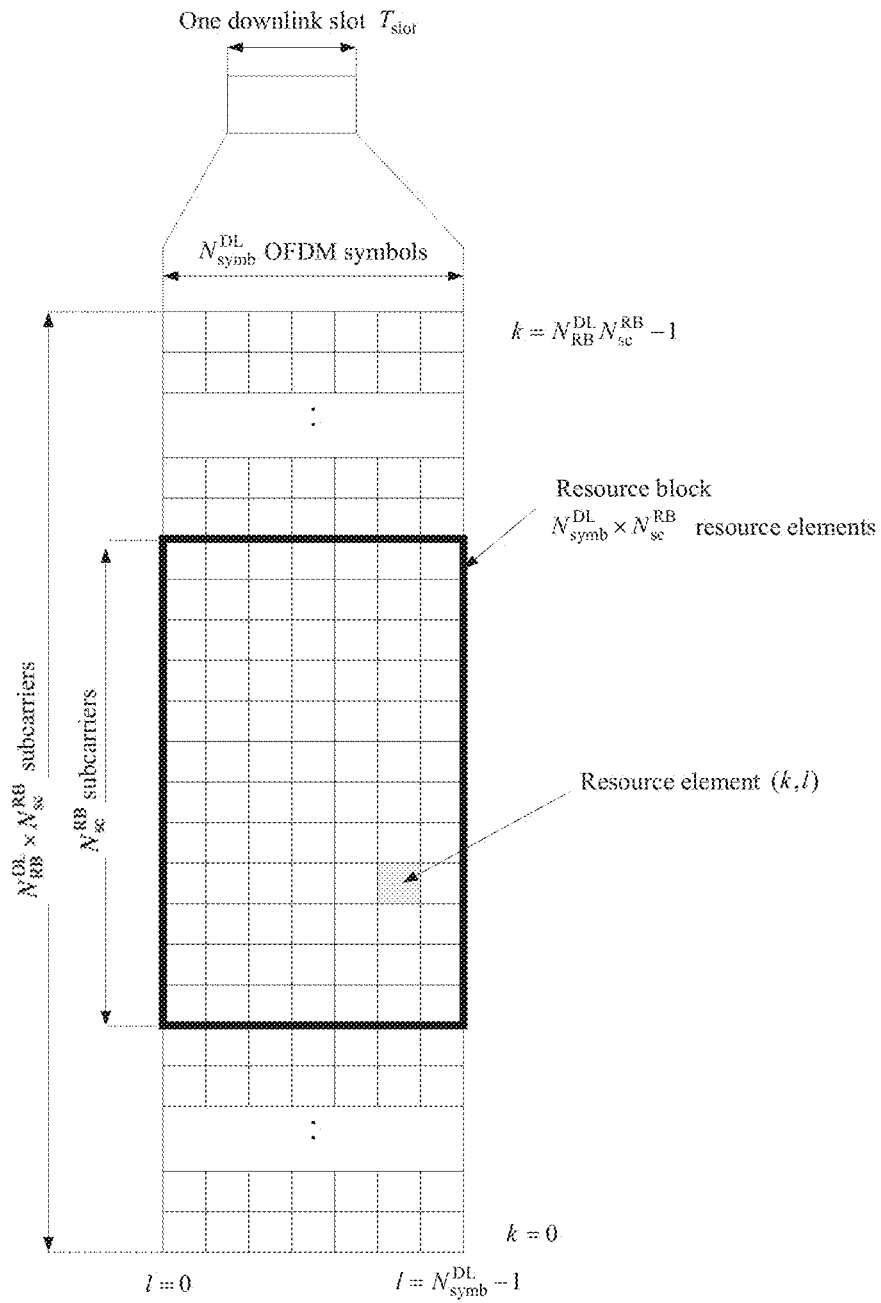
FIG. 2 shows an exemplary downlink resource grid of one of the two downlink slots of a sub-frame as defined for 3GPP LTE (Release 8)
Figure 3:
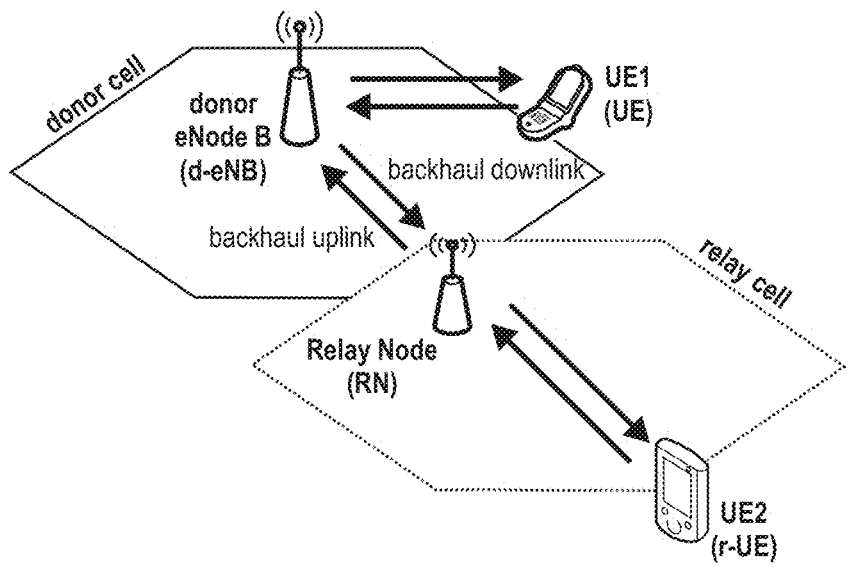
FIG. 3 shows an exemplary network configuration of a donor eNodeB (d-eNB), a relay node (RN) and two user equipments (UE1 and UE2)
Figure 4:
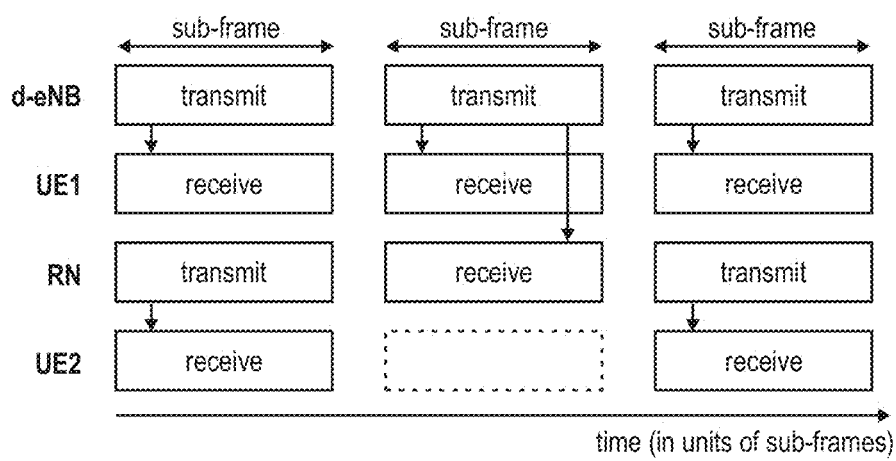
FIG. 4 shows an exemplary behavior of the entities in FIG. 3 with respect to their operation in transmission mode and reception mode.
Figure 5:
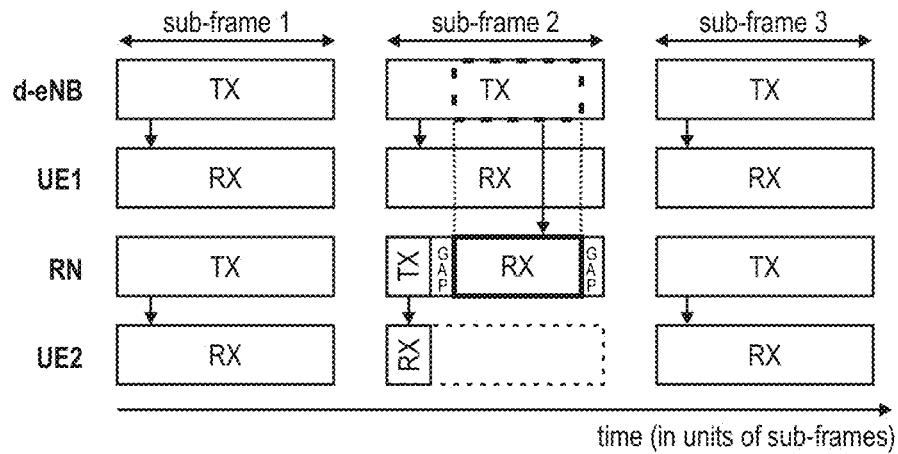
FIG. 5 shows an exemplary backward-compatible behavior of the entities in FIG. 3 with respect to their operation in transmission mode and reception mode in an enhanced communication system, such as 3GPP LTE-A (Release 10)
Figure 6:
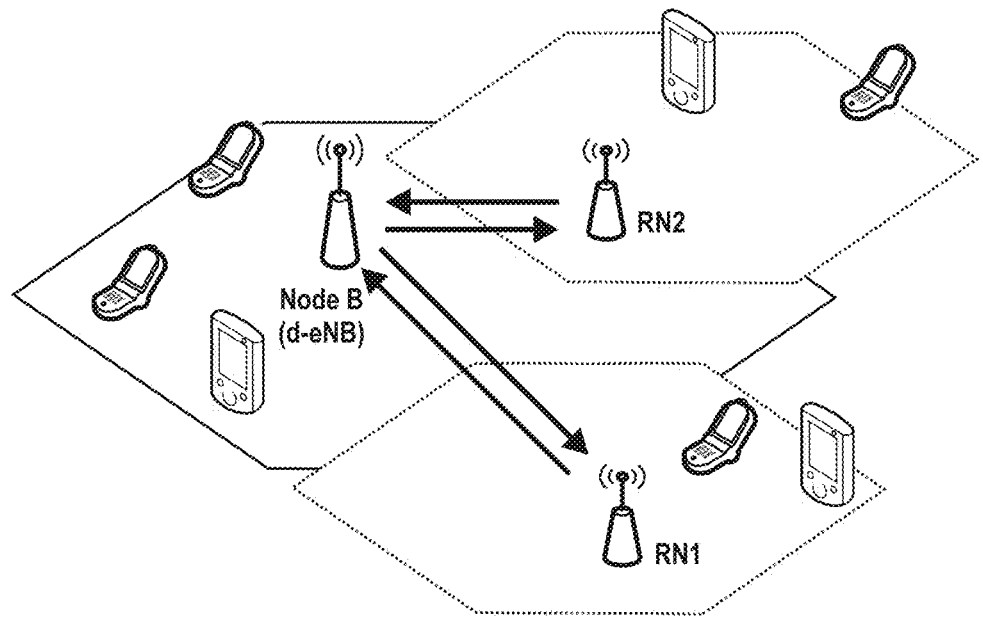
FIG. 6 shows another exemplary network configuration of a donor eNodeB (d-eNB), multiple relay nodes (RN1 and RN2) and multiple user equipments, FIG. 7 exemplarily illustrates the reception of a sub-frame from a donor eNodeB at different relay nodes and the transmission windows and reception windows of the relay nodes, taking into account the variable propagation delay of transmission signals between the donor eNodeB (d-eNB) and relay nodes (RN1 and RN2) and a switching between transmission mode and reception mode within the sub-frame at the relay nodes, FIGS. 8 & 9 exemplify the structure of a normal sub-frames, respectively a MBSFN sub-frames and a physical resource block pair thereof as defined for 3GPP LTE (Release 8) and 3GPP LTE-A (Release 10) and as used in some of the embodiments of the invention.
Figure 7:
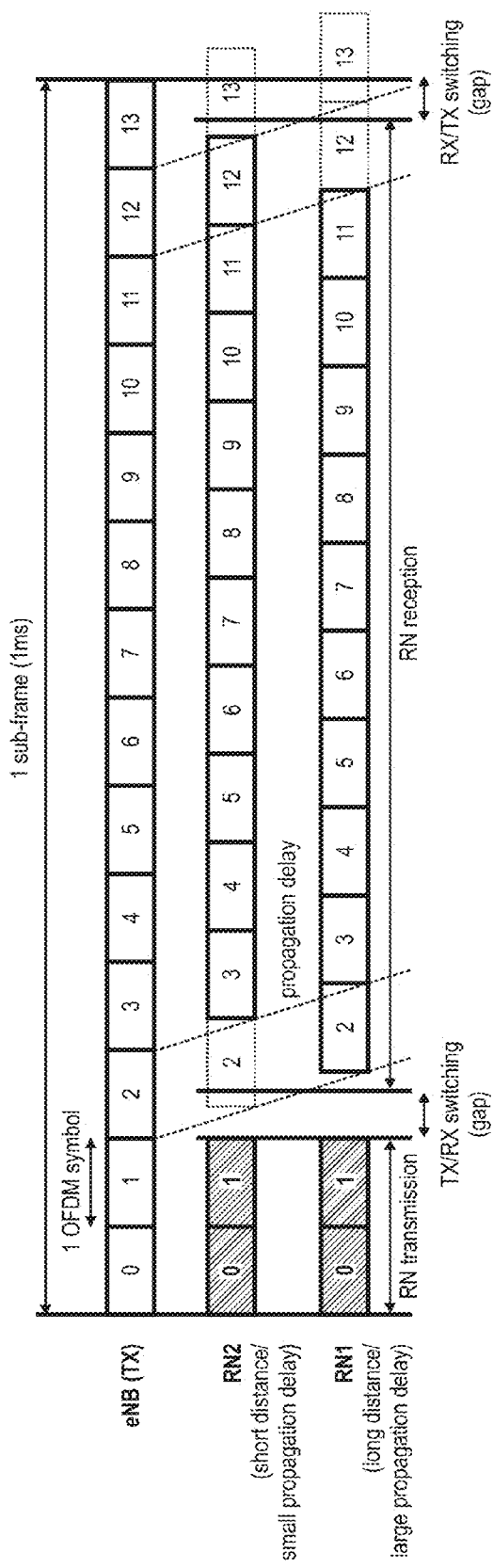
Figure 8:
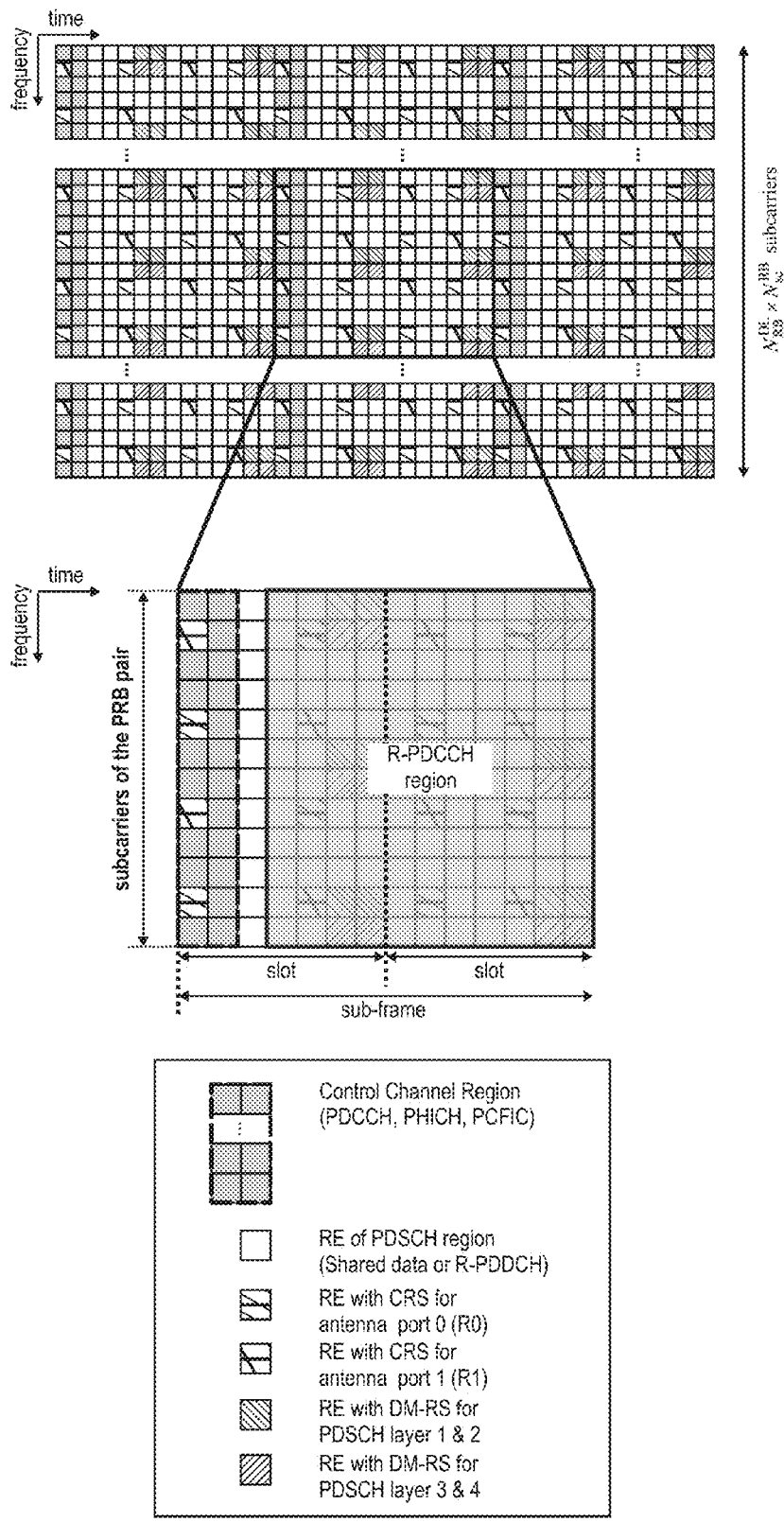
Figure 9:
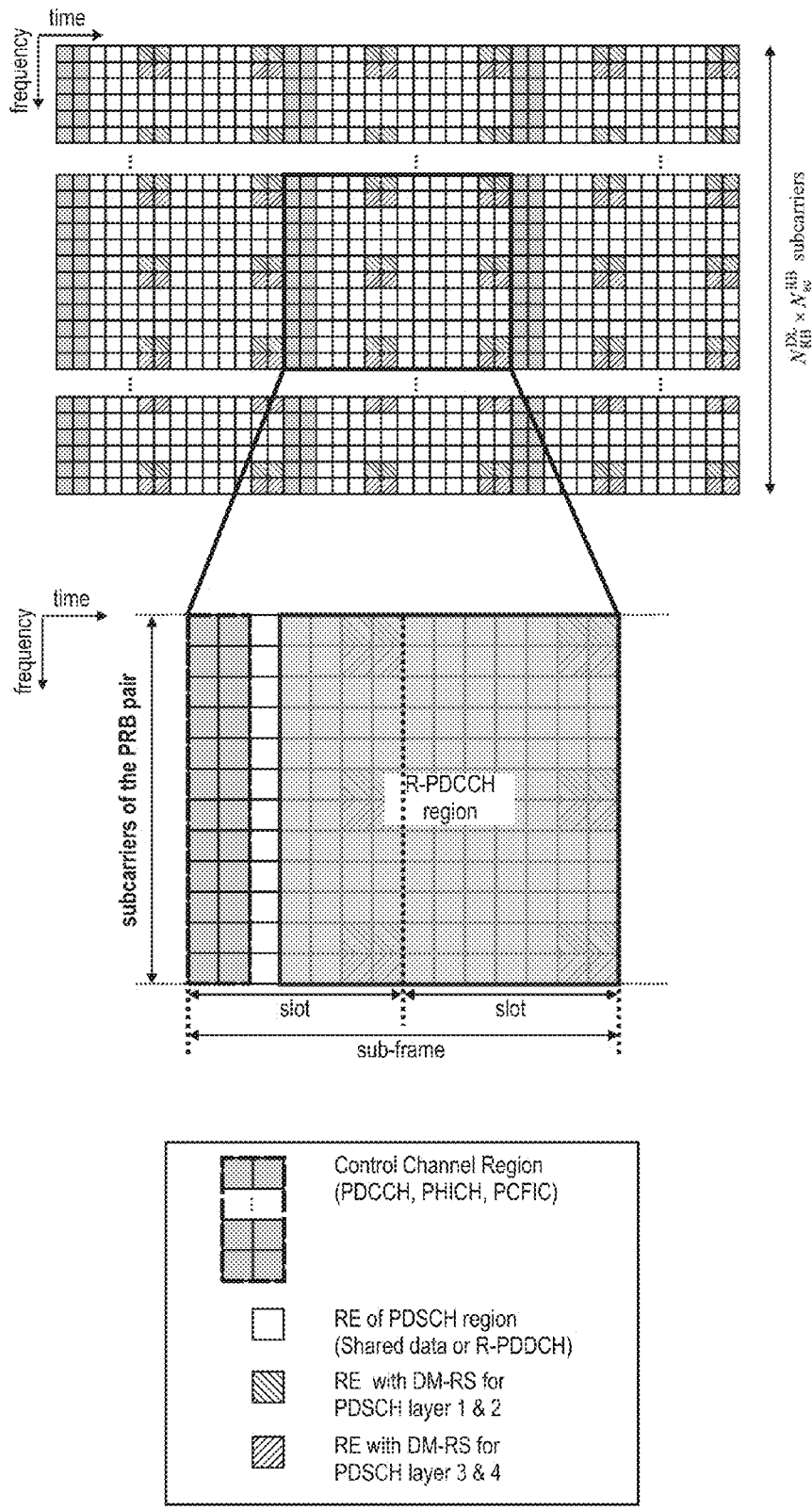
Figure 10:
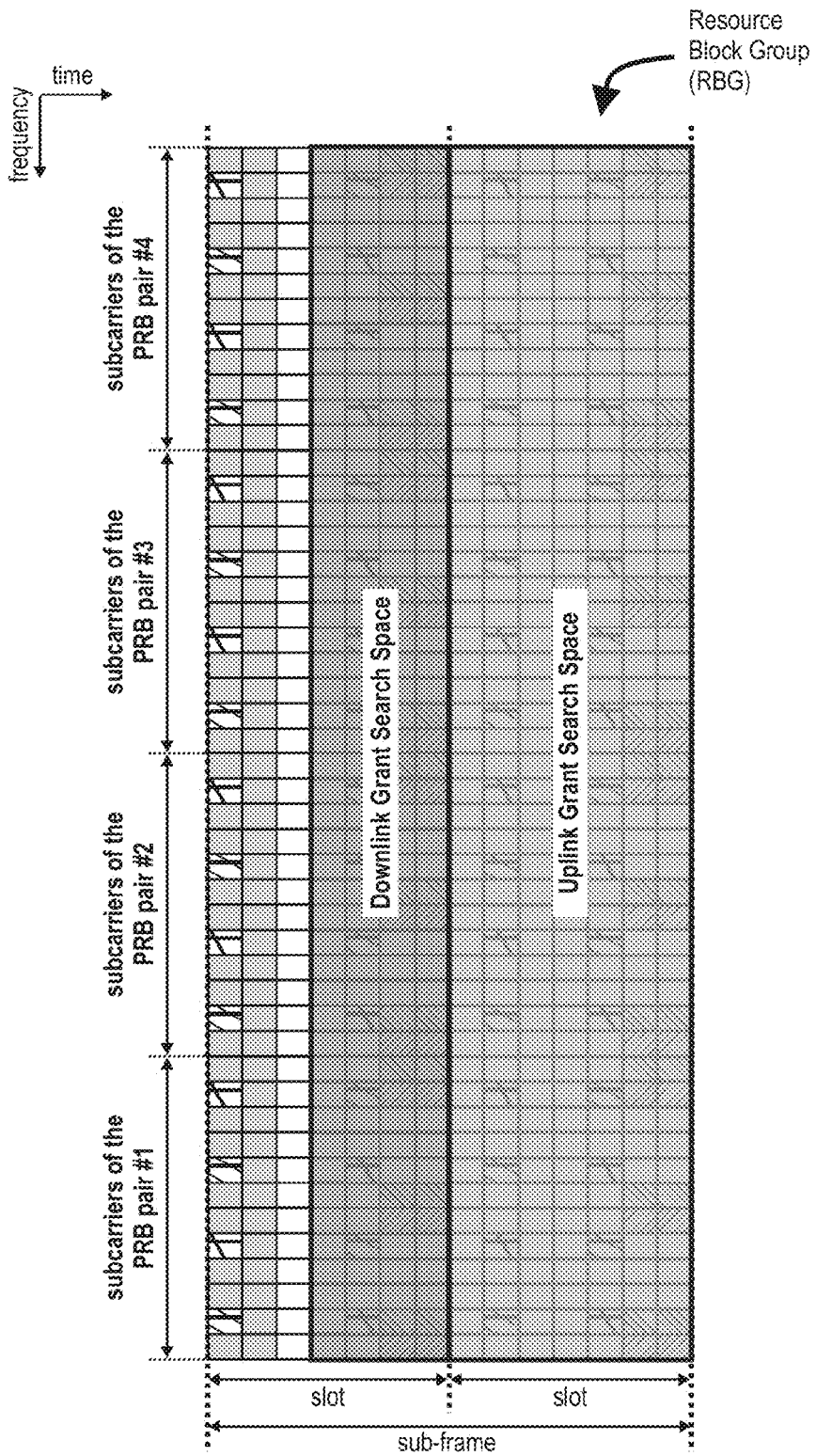
FIG. 10 shows an exemplary definition of a downlink grant search space (DL Grant Search Space) and an uplink grant search space (UL Grant Search Space) within a resource block group of sub-frame.

In a 3GPP LTE-A system, where component carrier aggregation can be used in the downlink (and uplink), the sub-frame may span multiple component carriers in the frequency domain. In one exemplary implementation the sub-frame is a sub-frame of a 3GPP LTE-A system and is structured as has been explained with respect to FIG. 1 and FIG. 2. Please note that besides a logical division of the sub-frame into physical resource blocks and physical resource block pairs, resource block groups consisting of a given number (e.g. 2, 3 or 4 physical resource blocks) may be defined.

The reception apparatus is aware of the search spaces for downlink grants and uplink grants in the sub-frame. Accordingly, the reception apparatus performs a blind decoding 2002 on the physical resources so the downlink grant search space to check, whether there is a downlink grant signaled to the reception apparatus. "Blind decoding" means that there is no associated control signaling that would indicate the CCE (Control Channel Element) aggregation size of the downlink grant or modulation and coding scheme for its L1/L2 control information, but the reception apparatus tests the resource elements of the downlink search space for all possible combinations of CCE aggregation sizes and modulation and coding schemes, and confirms that successful decoding of a downlink grant (respectively its L1/L2 control information) information based on the RNTI that is used to mask a CRC field attached to the L1/L2 control information.

The configuration of the respective search spaces may be for example predefined or may be configured by the network, e.g. by means of RRC signaling. In one exemplary implementation, the downlink grant search space may be configured by the network (e.g. a controlling base station) on a static or semi-static basis. For example, the downlink grants search space may be indicated to the reception apparatus by signaling the physical resource block pair indices of the physical resource block pairs or alternatively the resource block group index/indices of the resource block group(s) that are defined as the downlink grant search space. As indicated previously, the downlink grant search space may only be defined in the first slot of the sub-frame in the time domain, e.g. in a subset of the OFMD symbols thereof.

The uplink grants search space is depending on the downlink grant search space as discussed previously and is a subset of the downlink grants search space in terms of frequency resources. As discussed above, the definition of the downlink grant search space be provided as discussed with respect to one of FIGS. 13 to 18 previously herein.

The uplink grant search space may be further predefined, configured by the reception apparatus according to some predefined rules or according to control signaling (e.g. RRC control signaling).

For example, the predefined rules may for define how the uplink grant search space can be derived from the downlink grant search space. E.g. only the physical resource blocks of the physical resource block pairs of the downlink grant search space having an even or odd index and that located in the second slot of the sub-frame form the search space for uplink grants). Alternatively, the reception apparatus could also use the first l physical resource blocks (in the second slot) of the physical resource block pairs of the downlink grant search having the lowest or highest PRB indices, wherein l=⌈k/2⌉ or l=⌊k/2⌋ and k being the number of resource block indices forming the downlink grant search space in the frequency domain (⌊x⌋ is the flooring function, and ⌈x⌉ the ceiling function). The parameters for determining the uplink grant search space from the downlink grant search space or an explicit indication of the uplink grant search space may also be signaled from the network.

The reception apparatus checks 2003, whether a downlink grant for it has been successfully detected (i.e. demodulated and successfully decoded) from the resource elements in the downlink grant search space. If so, the reception apparatus proceeds further with step 2004. In the example of FIG. 20, it is assumed that the uplink grant search space is dynamically configured based on the blind detection result on the downlink grant search space. Hence, in case downlink grant has been detected by the reception apparatus, the reception apparatus adapts the size of the uplink grant search space accordingly. For example, as explained in connection with FIG. 15, if the downlink grant has been detected, the uplink grant search space may be further reduced in size, in comparison to the situation where there is no downlink grant detected in the downlink grants search space (see step 2010 and FIG. 13). Alternatively or in addition, the physical resource blocks on which the downlink grant is signaled may also define the frequency resources of the uplink grant search space—i.e. the physical resource blocks in the second slot of the PRB pairs on the physical resource blocks of which the downlink grant is received in the first slot are forming the uplink grant search space. If no dynamic adaption of the uplink grant search space is envisioned, step 2004 could be skipped.

If no downlink grant has been detected, the reception apparatus performs 2010 a blind detection for an uplink grant in the uplink grant search space within the second slot. In case the size of the uplink search space is dynamically adjusted according to the blind decoding result of step 2002, the uplink grant search space being blind decoded in step 2010 is larger than the uplink grant search space in step 2004, for example as shown in FIG. 13.

Next, the reception apparatus performs a blind detection 2005 on the determined uplink grant search space to detect a potential uplink grant signaled to the reception apparatus and demodulates and decodes 2006 the resource elements allocated by the downlink grant to obtain the downlink data. The resource elements on which a demodulation and decoding is performed are the resource elements of the resource blocks that are either located in the second slot of the sub-frame and not located within the uplink grant search space, or alternatively, the resource elements of the resource blocks that are either located in the second slot of the sub-frame and not located within the uplink grant search space and further the resource elements of the downlink grant search space in the first slot that are not used for the signaling the downlink grant. In case a HARQ protocol is used for the transmission of the downlink data on the PDSCH the reception apparatus may transmit a HARQ feedback (ACK/NACK) to the base station (e.g. together with the possible transmission of the uplink data in step 2008, as applicable). Please note that step 2006 may also be performed before step 2004 or step 2005.

Furthermore, the reception apparatus may further check 2007 whether an uplink grant has been received within the uplink grant search space. If not, no further operation of the reception apparatus is need and the reception apparatus can wait for the reception of the next sub-frame. Otherwise, the reception apparatus encodes 2008 the uplink data to generate a transport block according to the uplink grant and modulates the encoded data onto the uplink carrier for transmission 2009 to the base station. The uplink transmission 2009 may be for example sent 4 ms after reception of the uplink grant and/or using an HARQ protocol.

Figure 21:
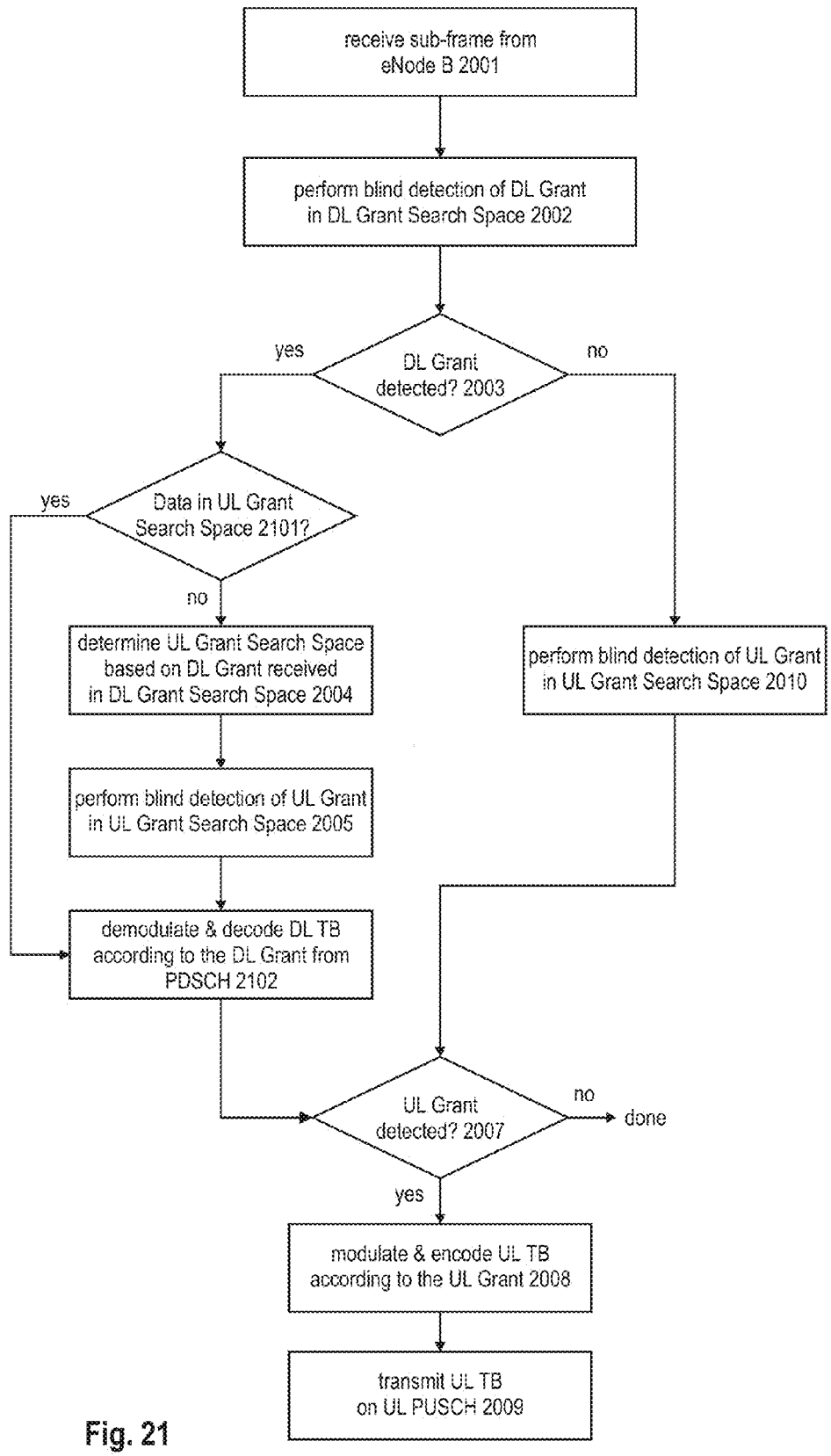
Figure 22:
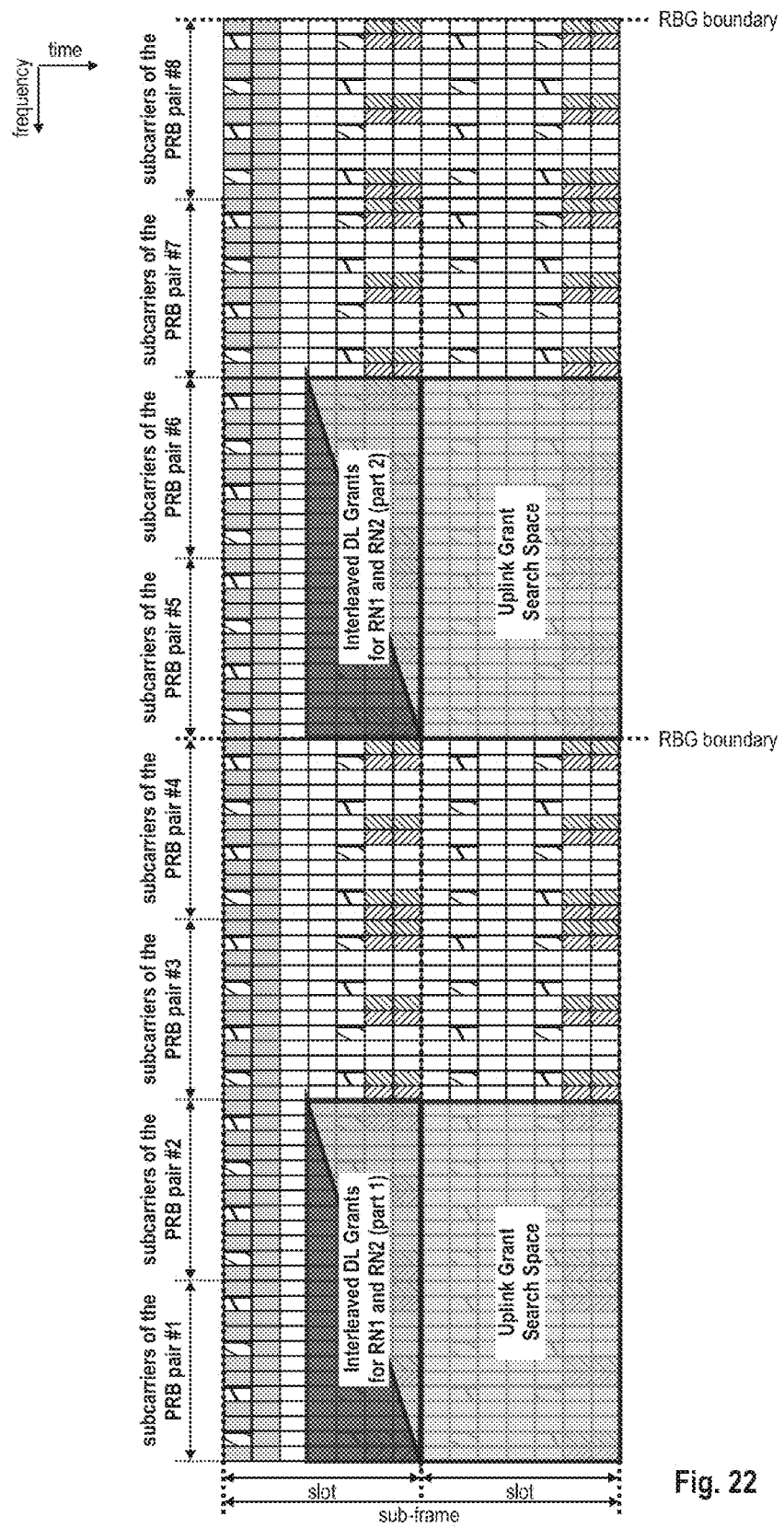

FIG. 21 shows another flow chart of the operation of a reception apparatus according to another exemplary embodiment of the invention. The flow chart of FIG. 21 is similar to FIG. 20 to a large extend. The two flow charts mainly differ in the operation of the reception apparatus due to the downlink grant that may be received in step 2002 comprising an indication of whether data has been mapped to the uplink grant search space in the second slot of the sub-frame received in step 2001 or not. In case a downlink grant has been detected by the reception apparatus, the reception apparatus checks whether the downlink grant indicates 2101 that data has been mapped to the uplink grant search space in the second slot of the sub-frame or not. If so, the reception apparatus determines 2004 that the allocated resource elements in the second slot of the sub-frame also comprise those of the uplink grant search space, as for example shown in FIG. 16. Hence, the reception apparatus can skip steps 2004 and 2005, as this means that there will be no uplink grant in the second slot of the sub-frame. The reception apparatus may this demodulate and decode 2102 the allocated resource elements of the second slot, including the resource elements of the uplink grant search space.

If the downlink grant indicates that there is no downlink data mapped to the uplink grant search space, the reception apparatus performs steps 2004 and 2005 as descried with respect to FIG. 20 and further, step 2102 would be similar to step 2006 in this case.

Furthermore, please note that in the exemplary operations described with respect to FIG. 20 and FIG. 21, a per-RBG resource allocation on the downlink for the reception apparatus can be assumed as has been outlined previously herein. Alternatively, the downlink resources may also be implicit to the definition of the downlink search space and defined on a per-PRB basis as also mentioned previously herein.

For cases where an implicit per-RBG allocation and downlink grant search space definition is provided, interleaving of downlink grants of multiple reception apparatuses becomes difficult. Consider for example the definition of a downlink grant search space and an uplink grant search space in two adjacent RBGs as shown in FIG. 21, wherein the search spaces are shared by two reception apparatuses (RN1 and RN2). When interleaving the reception apparatuses, the downlink grants for the two reception apparatuses would be distributed on the downlink grant search space across the two RBGs. Hence, it is unclear, which reception apparatuses is allocated the respective RBG resources of the downlink data. When reception apparatuses are interleaved and mapped to the same downlink grant search space, an explicit control signaling (e,g, RRC signaling) or signaling on a physical control channel within the uplink grant or downlink grant search space (e.g. within the R-PDCCH region) could be used to indicate to each reception apparatus whether the resources in a respective RBG are used for transmitting data (e.g. a R-PDSCH transmission) to the respective reception apparatus.

Alternatively, there may be implicit rules defined so that each reception apparatus knows whether the respective RBGs on which the downlink grant is received is allocated to the reception apparatus or not. One possibility is that the available PRBs within the RBGs are linked to the CCE index of the downlink grant. This way the reception apparatus could derive from the CCE indices on which its downlink grant is signaled, which of the resource blocks within the RBGs are allocated to it. Another possibility is to assign implicitly the odd number PRBs to reception apparatus RN1 and even number PRBs to reception apparatus RN2.

Another further option would be to alternatively assign physical resource blocks in the RBGs to which the downlink grants are mapped to the reception apparatuses that share the same downlink grant and uplink grant search space. For example, on one available downlink backhaul sub-frame, the resource blocks of the RBGs are available for data transmission (on the R-PDSCH) to reception apparatus RN1. Then in the next available downlink backhaul sub-frame, the resource blocks of the RBGs are available for data transmission (on the R-PDSCH) to reception apparatus RN2.

In another exemplary embodiment of the invention, the aggregation level of downlink grant is tied to the aggregation level of uplink grant. For example, if aggregation level 4 is used for downlink grants (i.e. 4 CCEs are used to signal the downlink grant), aggregation level 2 has to be used for uplink grants. In this case, blind decoding effort is further reduced. However, the flexibility of choosing the aggregation level for uplink grants is restricted. For example, if four PRBs in the first slot are allocated for a downlink grant, two PRBs in the second slot are defined as uplink grant search space. In this case, aggregation level 2 or 1 can be used for uplink grant.

In one variant of this embodiment the uplink grant search space is reserved for uplink grants, i.e. no data (e.g. R-PDSCH) will be transmitted in the uplink grant search space. Therefore, similar to using the bit corresponding to the RBG carrying the downlink grant for indicating whether downlink data is mapped to the uplink grant search space, this one bit of the resource allocation field in downlink grant could be interpreted by the reception apparatus as the indicator of whether or not the resource blocks other than that of the uplink grant search space (and the resource blocks used for the downlink grant) is available for the reception apparatus that receives the downlink grant in the first slot. In case of interleaving of the search spaces and using CRS, it can be this ensured that only one reception apparatus receives this indication so that a conflict in the resource assignment can be avoided and interleaving of multiple reception apparatus becomes possible.

Alternatively, implicit rules can also be defined so that multiple reception apparatuses can share the resource blocks available for data transmission (e.g. for the R-PDSCH) in one sub-frame.

In several figures (e.g. FIGS. 8 to 19 and 22) showing parts of a sub-frame structure, some resource elements are shown to comprise reference symbols (DM-RS, CRS). Whether these resource elements containing reference symbols are considered part of a search space or resource allocation (grant) or not is a matter of definition and are both envisioned herein. In both cases, control signaling (e.g. PDCCH, R-PDCCH) and (user) data (e.g. PDSCH data, R-PDSCH data) is mapped only to resource elements that do not contain reference symbols.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for detecting at least one of a downlink grant and an uplink grant within a sub-frame of a OFDM-based mobile communication system, the method comprising the following steps performed by a reception apparatus:
   receiving a sub-frame from a base station, wherein the sub-frame is logically divided into physical resource block pairs, and a respective resource block pair consisting of a resource block within a first slot of the sub-frame and a resource block within a second slot of the sub-frame,
   performing a blind detection to detect a downlink grant within a downlink grant search space of the sub-frame, wherein the downlink grant search space consists of plural physical resource blocks of resource block pairs within the first slot of the sub-frame,
   performing a blind detection to detect an uplink grant within an uplink grant search space of the sub-frame, wherein the uplink grant search space consists of plural physical resource blocks within the second slot of the sub-frame, and wherein the physical resource blocks within the second slot is located within a subset of the physical resource block pairs, on which the physical resource blocks within the first slot form the downlink grant search space,
   demodulating and decoding downlink data according to the detected downlink grant, and
   modulating, coding, and transmitting transmittal data according to the detected uplink grant.

2. A method for detecting at least one of a downlink grant and an uplink grant within a sub-frame of a OFDM-based mobile communication system, the method comprising the following steps performed by a reception apparatus:
   receiving a sub-frame from a base station, wherein the sub-frame is logically divided into physical resource block pairs, and a respective resource block pair consisting of a resource block within a first slot of the sub-frame and a resource block within a second slot of the sub-frame,
   performing a blind detection to detect a downlink grant within a downlink grant search space of the sub-frame, wherein the downlink grant search space consists of plural physical resource blocks within the first slot of the sub-frame, demodulating and decoding downlink data according to the downlink grant,
   determining based on the detected downlink grant, whether there is data mapped to the uplink grant search space of the sub-frame,
   if it is determined that no data mapped to the uplink grant search space of the sub-frame, performing a blind detection to detect an uplink grant within an uplink grant search space of the sub-frame, and modulating, coding, and transmitting transmittal data according to the detected uplink grant,
   wherein the uplink grant search space consists of a subset of the physical resource blocks within the second slot of the sub-frame, and wherein the subset of the physical resource blocks within the second slot is located within the physical resource block pairs the physical resource blocks that form the downlink grant search space.

3. The method according to claim 1 or 2, wherein the number of physical resource blocks within the second slot of the sub-frame forming the uplink grant search space is determined based on the result of the blind detection for the downlink grant.

4. The method according to claim 1 or 2, wherein if it is determined that data is mapped to the uplink grant search space of the sub-frame, the number of physical resource blocks within the second slot of the sub-frame forming the uplink grant search space is lower than the number of physical resource blocks within the second slot of the sub-frame forming the uplink grant search space, in case no downlink grant is detected in the downlink grant search space.

5. The method according to claim 1 or 2, wherein the number of physical resource blocks within the second slot of the sub-frame forming the uplink grant search space is lower than the number of physical resource blocks within the first slot of the sub-frame forming the downlink grant search space.

6. The method according to one of claim 1 or 2, wherein in case a downlink grant is detected in the downlink grant search space of the sub-frame, the reception apparatus determines the uplink grant search space to consist of a subset of the physical resource blocks within the second slot of the sub-frame, belonging to the physical resource block pairs of the physical resource blocks on which the downlink grant is detected in the first slot of the sub-frame.

7. The method according to one of claim 1 or 2, wherein in case no downlink grant is detected in the downlink grant search space of the sub-frame, the reception apparatus determines the uplink grant search space to consist of a subset of the physical resource blocks within the second slot of the sub-frame belonging to the resource block pairs of the physical resource blocks forming the downlink grant search space in the first slot of the sub-frame.

8. The method according to one of claim 1 or 2, wherein the number of physical resource blocks within the second slot of the sub-frame forming the uplink grant search space is determined by the reception apparatus according to control signaling or a predefined rule based on which the uplink grant search space can be derived from the downlink grant search space.

9. The method according to claim 1, wherein the downlink grant search space is formed by the physical resource blocks of at least one resource block group, and wherein the uplink grant search space formed by a subset of the physical resource blocks of the second slot of the sub-frame located within said of at least one resource block group.

10. The method according to claim 9, wherein the downlink grant comprises a bit-map, each bit position of the bit-map being associated to a physical resource block group and indicating whether the respective associated physical resource block group is allocated to the reception apparatus for downlink data transmission,
   wherein the resource block group comprising the downlink grant is always allocated to the reception apparatus and the bit of the bit-map associated to the resource block group comprising the downlink grant is used as an indicator for indicating whether there is data mapped to the uplink grant search space within the resource block group comprising the downlink grant or not.

11. The method according to claim 9, further comprising the steps of:
   receiving, according to the detected downlink grant, downlink data for the reception apparatus on the physical resources of the resource block group comprising the downlink grant which are not used for the signaling of the downlink grant, if it is determined based on a downlink grant received in the downlink grant search space that there is no data mapped to the uplink grant search space of the resource block group comprising the downlink grant and receiving, according to the detected downlink grant, downlink data for the reception apparatus on the physical resources of the resource block group comprising the downlink grant which are not used for the signaling of the downlink grant and which are not located in the uplink grant search space, if it is determined based on a downlink grant received in the downlink grant search space that there is no data mapped to the uplink grant search space of the resource block group comprising the downlink grant.

12. A reception apparatus for detecting at least one of a downlink grant and an uplink grant within a sub-frame of a OFDM-based mobile communication system, the reception apparatus comprising:
 a receiver section receiving a sub-frame from a base station, wherein the sub-frame is logically divided into physical resource block pairs, and a respective resource block pair consisting of a resource block within a first slot of the sub-frame and a resource block within a second slot of the sub-frame,
 a decoding section performing a blind detection to detect a downlink grant within a downlink grant search space of the sub-frame and demodulating and decoding downlink data according to the detected downlink grant, wherein the downlink grant search space consists of plural physical resource blocks of resource block pairs within the first slot of the sub-frame, and
 a coding section modulating, coding, and transmitting transmittal data according to the detected uplink grant,
 wherein the decoding section is further adapted to perform a blind detection to detect an uplink grant within an uplink grant search space of the sub-frame, wherein the uplink grant search space consists of a subset of the physical resource blocks within the second slot of the sub-frame and wherein the subset of the physical resource blocks within the second slot is located within the physical resource block pairs the physical resource blocks that form the downlink grant search space.

13. A reception apparatus for detecting at least one of a downlink grant and an uplink grant within a sub-frame of a OFDM-based mobile communication system, the reception apparatus comprising:
 a receiver section receiving a sub-frame from a base station, wherein the sub-frame is logically divided into physical resource block pairs, and a respective resource block pair consisting of a resource block within a first slot of the sub-frame and a resource block within a second slot of the sub-frame,
 a decoding section performing a blind detection to detect a downlink grant within a downlink grant search space of the sub-frame and demodulating and decoding downlink data according to the detected downlink grant, and, wherein the downlink grant search space consists of plural physical resource blocks within the first slot of the sub-frame, and
 a processing section determining based on the detected downlink grant, whether there is data mapped to the uplink grant search space of the sub-frame, and
 a coding section modulating, coding, and transmitting transmittal data according to the detected uplink grant,
 wherein the decoding section is adapted to perform a blind detection to detect an uplink grant within an uplink grant search space of the sub-frame, if it is determined that no data mapped to the uplink grant search space of the sub-frame, and
 wherein the uplink grant search space consists of a subset of the physical resource blocks within the second slot of the sub-frame and wherein the subset of the physical resource blocks within the second slot is located within the physical resource block pairs the physical resource blocks that form the downlink grant search space.

\* \* \* \* \*